United States Patent [19]

Bradt et al.

[11] 4,403,293
[45] Sep. 6, 1983

[54] CONTROL APPARATUS FOR USE IN MULTIPLE STEAM GENERATOR OR MULTIPLE HOT WATER GENERATOR INSTALLATIONS

[75] Inventors: Willy A. Bradt, Boom; Norbert J. F. Wilssens, Kruibeke, both of Belgium

[73] Assignee: Clayton Manufacturing Company, Calif.

[21] Appl. No.: 241,351

[22] Filed: Mar. 6, 1981

[51] Int. Cl.³ .................. G05B 15/02; F01D 17/02
[52] U.S. Cl. .................................. 364/494; 364/156; 236/14
[58] Field of Search ............... 364/492, 494, 153, 156, 364/493; 122/94 R; 236/14; 237/8 R, 9 R

[56] References Cited

U.S. PATENT DOCUMENTS

| | | | |
|---|---|---|---|
| 3,387,121 | 6/1968 | Maczuzak et al. | 364/492 |
| 3,602,703 | 8/1971 | Polenz | 364/492 |
| 3,616,997 | 11/1971 | Oldenburg | 236/14 |
| 3,849,637 | 11/1974 | Caruso et al. | 364/153 X |
| 3,877,636 | 4/1975 | Sato | 236/14 |
| 3,960,320 | 6/1976 | Slater | 364/153 X |
| 4,003,342 | 1/1977 | Hodgson | 236/14 X |
| 4,069,675 | 1/1978 | Adler et al. | 364/156 X |
| 4,179,742 | 12/1979 | Stern et al. | 364/494 |
| 4,184,324 | 1/1980 | Kiscaden et al. | 364/494 X |

*Primary Examiner*—Edward J. Wise
*Attorney, Agent, or Firm*—Jackson, Jones & Price

[57] ABSTRACT

A control apparatus for controlling the generators of a multiple steam generator or multiple hot water generator installation. The control apparatus includes burner command apparatus which limits each of the generators to one of at least two different maximum firing rate levels. The command apparatus is controlled by a data storage device, such as a microcomputer, which periodically adjusts the maximum firing rate level of the generators in accordance with the predicted loads of the installation. The firing rate of the generators is controlled by modulating apparatus which varies the firing rate within the maximum firing rate levels in accordance with the actual measured installation load. By controlling the actual firing rate in response to both the predicted and the actual installation loads, efficiency of operation may be optimized.

24 Claims, 36 Drawing Figures

Microfiche Appendix Included
(7 Microfiche, 193 Pages)

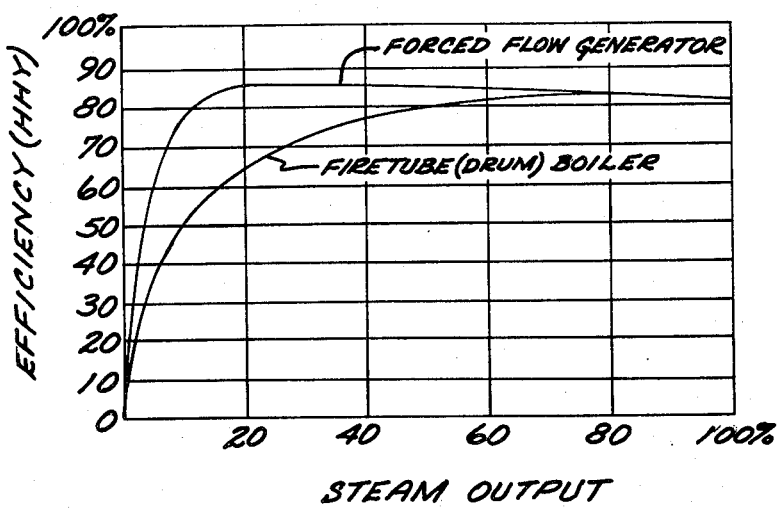
FIG. 3
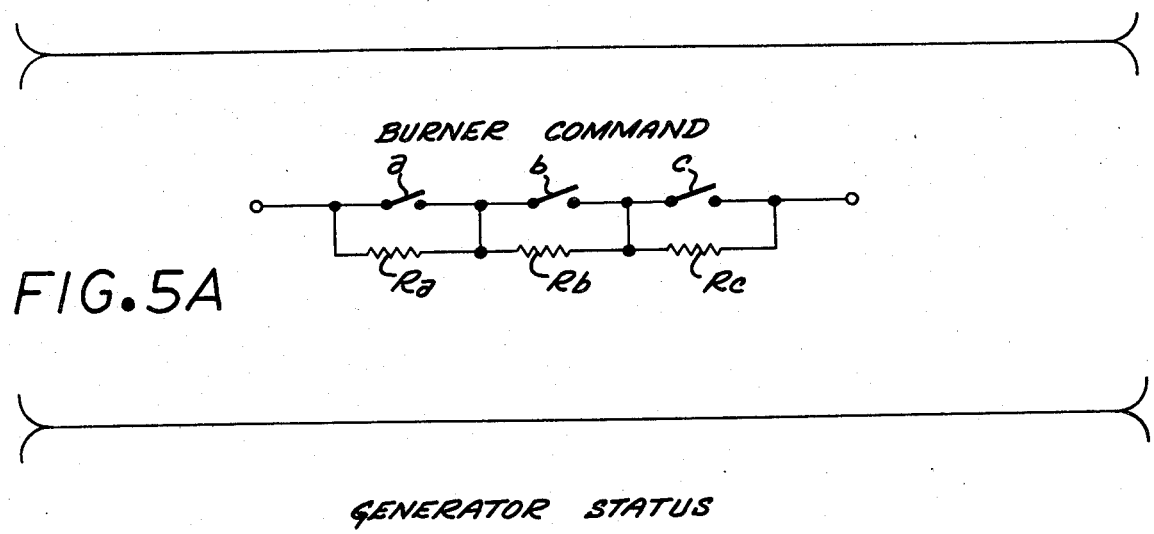
FIG. 5A
GENERATOR STATUS
FIG. 5B
| a | b | c | % OUTPUT | GENERATOR STATUS |
|---|---|---|---|---|
| 1 | 1 | 1 | 0 | 0 (GENERATOR OFF) |
| 1 | 1 | 1 | 20 | 1 |
| 1 | 1 | 0 | 60 | 2 |
| 1 | 0 | 0 | 80 | 3 |
| 0 | 0 | 0 | 100 | 4 |

LOAD TABLE (2 GENERATORS)

| LOAD | | NUMBER OF GENERATORS ON LINE | LOAD DIVIDER | | | |
|---|---|---|---|---|---|---|
| INDEX (0-7) | LEVEL (0-10) | | GEN. 1 | | GEN. 2 | |
| | | | STATUS | OUTPUT | STATUS | OUTPUT |
| 0 | 0 | 0 | 0 | 0 | 0 | 0 |
| 1 | 1 | 1 | 2 | 0-60% | 0 | 0 |
| 2 | 2 | 1 | 3 | 0-80% | 0 | 0 |
| 3 | 3 | 1 | 4 | 0-100% | 0 | 0 |
| 4 | 4-5 | 2 | 3 | 0-80% | 2 | 0-60% |
| 5 | 6-7 | 2 | 4 | 0-100% | 2 | 0-60% |
| 6 | 8 | 2 | 4 | 0-100% | 3 | 0-80% |
| 7 | 9-10 | 2 | 4 | 0-100% | 4 | 0-100% |

FIG. 6A

LOAD TABLE (3 GENERATORS)

| LOAD | | NUMBER OF GENERATORS ON LINE | LOAD DIVIDER | | | | | |
|---|---|---|---|---|---|---|---|---|
| INDEX (0-7) | LEVEL (0-15) | | GEN. 1 | | GEN. 2 | | GEN. 3 | |
| | | | STATUS | OUTPUT | STATUS | OUTPUT | STATUS | OUTPUT |
| 0 | 0 | 0 | 0 | 0 | 0 | 0 | 0 | 0 |
| 1 | 1-3 | 1 | 4 | 0-100% | 0 | 0 | 0 | 0 |
| 2 | 4-5 | 2 | 4 | 0-100% | 2 | 0-60% | 0 | 0 |
| 3 | 6-7 | 2 | 4 | 0-100% | 3 | 0-80% | 0 | 0 |
| 4 | 8-9 | 2 | 4 | 0-100% | 4 | 0-100% | 0 | 0 |
| 5 | 10-11 | 3 | 4 | 0-100% | 3 | 0-80% | 3 | 0-80% |
| 6 | 12-13 | 3 | 4 | 0-100% | 4 | 0-100% | 3 | 0-80% |
| 7 | 14-15 | 3 | 4 | 0-100% | 4 | 0-100% | 4 | 0-100% |

FIG. 6B

LOAD TABLE (4 GENERATORS)

| LOAD INDEX (0-7) | LOAD LEVEL (0-20) | NUMBER OF GENERATORS ON LINE | LOAD DIVIDER ||||||||
|---|---|---|---|---|---|---|---|---|---|---|
| | | | GEN. 1 || GEN. 2 || GEN. 3 || GEN. 4 ||
| | | | STATUS | OUTPUT | STATUS | OUTPUT | STATUS | OUTPUT | STATUS | OUTPUT |
| 0 | 0 | 0 | 0 | 0 | 0 | 0 | 0 | 0 | 0 | 0 |
| 1 | 1-3 | 1 | 4 | 0-100% | 0 | 0 | 0 | 0 | 0 | 0 |
| 2 | 4-7 | 2 | 4 | 0-100% | 2 | 0-60% | 0 | 0 | 0 | 0 |
| 3 | 8-9 | 2 | 4 | 0-100% | 3 | 0-80% | 0 | 0 | 0 | 0 |
| 4 | 10-11 | 3 | 4 | 0-100% | 2 | 0-60% | 2 | 0-60% | 0 | 0 |
| 5 | 12-13 | 3 | 4 | 0-100% | 3 | 0-80% | 3 | 0-80% | 0 | 0 |
| 6 | 14-15 | 4 | 4 | 0-100% | 4 | 0-100% | 3 | 0-80% | 2 | 0-60% |
| 7 | 16-20 | 4 | 4 | 0-100% | 4 | 0-100% | 4 | 0-100% | 4 | 0-100% |

FIG. 6C

DAY SEQUENCE TABLE

| DAY NUMBER | PERIODIC | APERIODIC |
|---|---|---|
| 1 | 1 | 1 |
| 2 | 1 | 1 |
| 3 | 3 | 2 |
| 4 | 4 | 2 |
| 5 | 6 | 2 |
| 6 | 7 | 7 |
| 7 | 7 | 7 |
| 8 | 1 | 1 |
| 9 | 2 | 3 |
| 10 | 4 | 2 |
| 11 | 3 | 2 |
| 12 | 6 | 6 |
| 13 | 6 | 6 |
| 14 | 6 | 6 |
| 15 | 2 | 6 |
| 16 | 2 | 3 |
| 17 | 4 | 3 |
| 18 | 4 | 4 |
| 19 | 6 | 6 |
| 20 | 7 | 7 |
| 21 | 7 | 7 |
| | | |

NOMINAL STACK TEMPERATURES

| LOAD | | 10% | 20% | 30% | 40% | 50% | 60% | 70% | 80% | 90% | 100% |
|---|---|---|---|---|---|---|---|---|---|---|---|
| STACK TEMPERATURE C° | OIL | - | 135 | 175 | 225 | 260 | 270 | 280 | 300 | 305 | 310 |
| | GAS | - | 122 | 137 | 150 | 200 | 240 | 255 | 280 | 280 | 285 |

TRIM VALUE TABLE (OIL FIRED)

| LOAD % | 20 | 30 | 40 | 50 | 60 | 70 | 80 | 90 | 100 |
|---|---|---|---|---|---|---|---|---|---|
| EXCESS AIR % | 40 | 40 | 40 | 30 | 30 | 30 | 20 | 20 | 20 |
| TRIM VALUE | 192 | 192 | 192 | 154 | 154 | 154 | 115 | 115 | 115 |

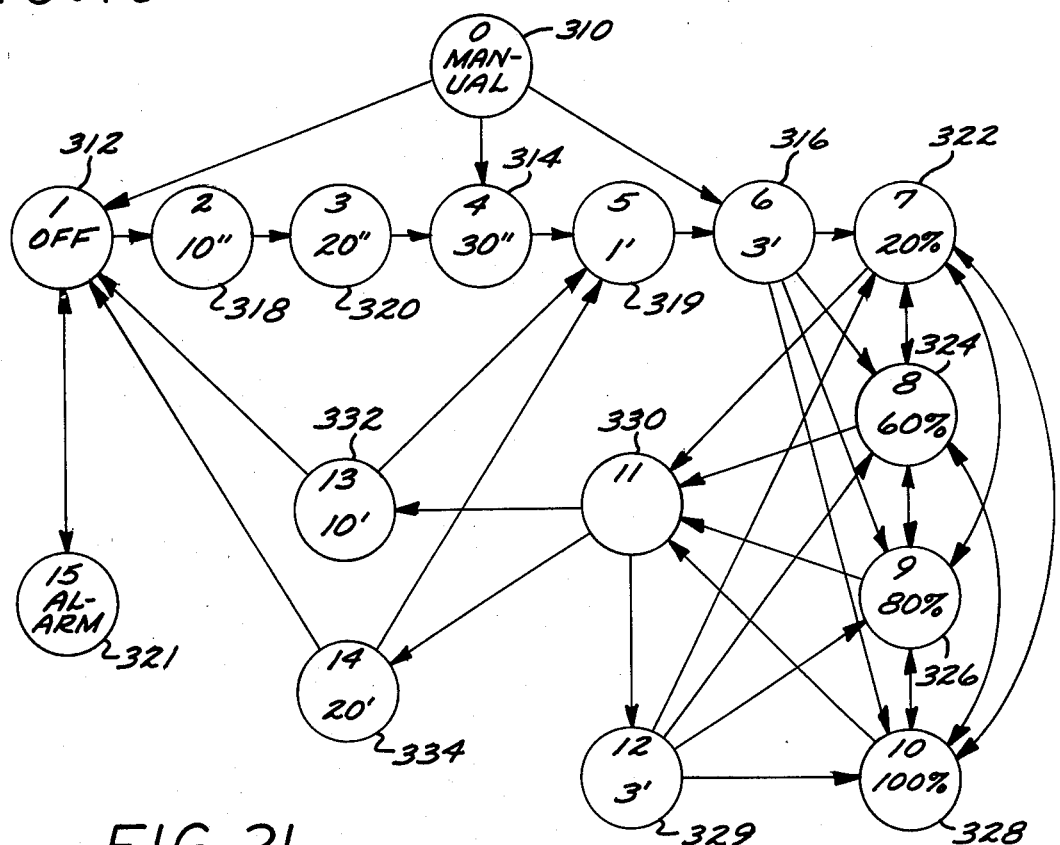
FIG. 19  GENERATOR STATUS
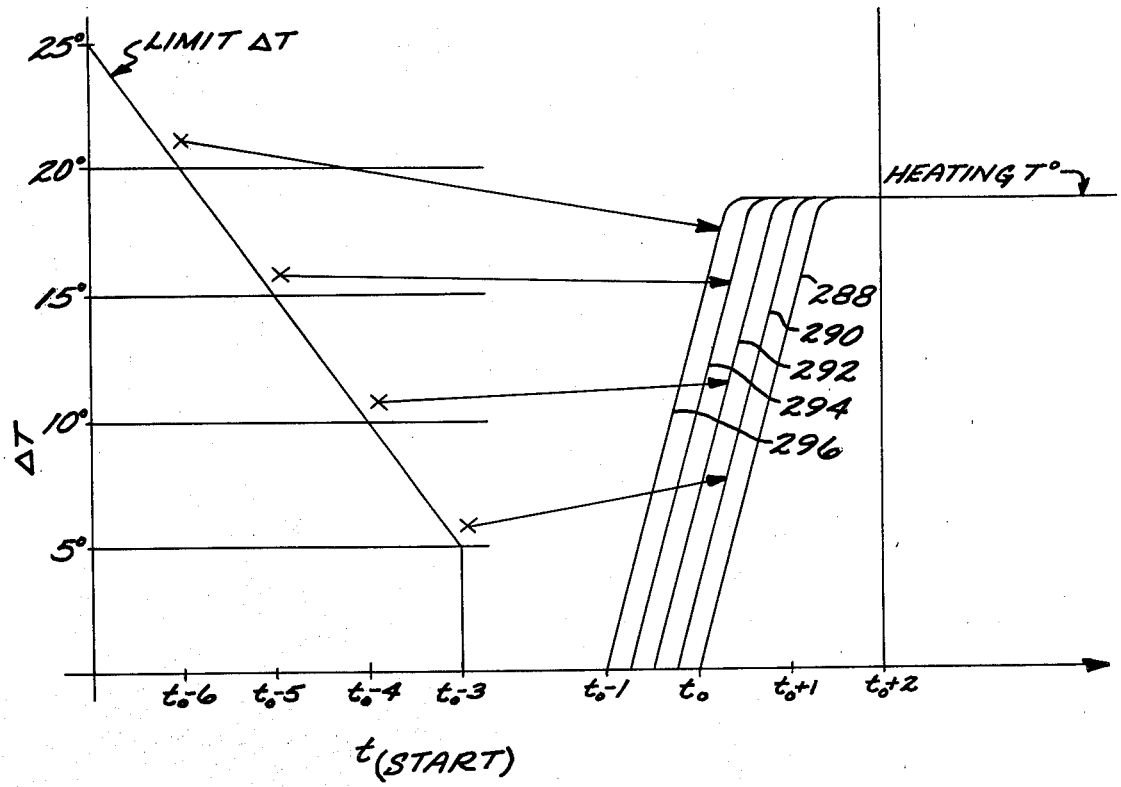
FIG. 21

GENERATOR STATE TABLE

| STATE | NAME | TIME (MINUTES) | GEN. START | GEN START LIGHT | BURNER START | BURNER COMMAND | | |
|---|---|---|---|---|---|---|---|---|
| | | | | | | a | b | c |
| 0 | MANUAL | / | / | / | / | / | / | / |
| 1 | SHUT OFF | / | 0 | 0 | 0 | 1 | 1 | 1 |
| 2 | BLINKING LIGHT | 10" | 0 | 1/0 | 0 | 1 | 1 | 1 |
| 3 | MOTOR ON | 20" | 1 | 1 | 0 | 1 | 1 | 1 |
| 4 | PUMPING | 30" | 1 | 0 | 0 | 1 | 1 | 1 |
| 5 | H.O. CHECK | | 1 | 0 | 0 | 1 | 1 | 1 |
| 6 | BURNER START | 3' | 1 | 0 | 1 | 1 | 1 | 1 |
| 7 | 20% | / | 1 | 0 | 1 | 1 | 1 | 1 |
| 8 | 60% | / | 1 | 0 | 1 | 1 | 1 | 0 |
| 9 | 80% | / | 1 | 0 | 1 | 1 | 0 | 0 |
| 10 | 100% | / | 1 | 0 | 1 | 0 | 0 | 0 |
| 11 | BURNER STOP | | 1 | 0 | 1 | 1 | 1 | 1 |
| 12 | SOOT BLOWING | 3' | 1 | 0 | 1 | 0 | 0 | 0 |
| 13 | STANDBY | 10' | 1 | 0 | 0 | 1 | 1 | 1 |
| 14 | SHUT DOWN | 20' | 1 | 0 | 0 | 1 | 1 | 1 |
| 15 | ALARM | / | 0 | 0 | 0 | 1 | 1 | 1 |

FIG. 20

OPEN STEAM TRAP TIME (MINUTES PER HOUR)

| | STEAM PRESSURE (bar) | FEED TEMP °C | TRAP PRESSURE (bar) | FIRING RATE | | | | |
|---|---|---|---|---|---|---|---|---|
| | | | | 20% | 40% | 60% | 80% | 100% |
| OPEN SYSTEM | 9.14 | 82 | 5.3 | 7.5 | 14.6 | 22.9 | 30.7 | 37.4 |
| DEAERATOR SYSTEM | 9.14 | 115 | 6 | 5.6 | 10.2 | 17.7 | 23.8 | 29.0 |
| SEMI-CLOSED SYSTEM | 14.0 | 153 | 8.5 | 2.5 | 4.9 | 7.7 | 10.3 | 12.6 |

FIG. 22

CONTROL APPARATUS FOR USE IN MULTIPLE STEAM GENERATOR OR MULTIPLE HOT WATER GENERATOR INSTALLATIONS

REFERENCE TO A MICROFICHE APPENDIX

Reference is made to a Microfiche Appendix filed concurrently herewith, which sets forth a computer program listing relating to the subject invention. The Microfiche Appendix comprise 7 total number of microfiche and 193 total number of frames.

BACKGROUND OF THE INVENTION

1. Field of the Invention

The subject invention relates generally to the field of control apparatus and more particularly to control apparatus for use in multiple steam generator or multiple hot water generator installations.

2. Prior Art

Many steam or hot water generating facilities utilize a single generator having sufficient capacity to satisfy the maximum predicted loads. In most instances, the actual steam/hot water load is much less than the maximum load; therefore the single generator will be operating at an inefficiently low firing rate. In order to increase efficiency, multiple medium and multiple low capacity generators have been used. During high steam/hot water load conditions, all of the generators will be on line to meet the increased demand. At lower loads, one or more of the generators will be placed on standby or will be completely shut off so that the remaining generators will be fired at higher and generally more efficient firing rates.

Various control apparatus have been used for optimizing the efficiency of multiple steam/hot water generator facilities. One such prior art control apparatus is used for controlling facilities utilizing forced flow type generators which are capable of being brought on line from a shut off condition to a maximum firing rate in typically five minutes. In most applications, the generators are brought on and off line in response to the measured steam pressure or measured hot water temperature which are indicative of the steam load or hot water load, respectively.

Operation of such prior art control apparatus can be described briefly as follows. At high steam pressures or water temperatures, it is possible that only one generator will be on line with the remaining generators being shut off. Should the steam pressure or water temperature drop a predetermined amount, a second generator will be brought on line. In the event the pressure/temperaure further drops another predetermined amount, a third generator will be brought on line (if one is available). This process will continue until the steam pressure or water temperaure stabilize or until all available generators have been brought on line. Similarly, should the steam pressure or water temperature increase, generators will be taken off line in a staged manner until either the pressure or temperature has either stabilized or until there is only a single generator remaining on line.

A generator which is shut off consumes significantly less energy than a generator which is placed on standby or at a minimum firing rate. Thus, the above-described prior art control apparatus significantly improves the efficiency of a system in comparison to control apparatus wherein the off-line generators are placed on standby. However, such control apparatus possesses significant limitations, especially in applications wherein the steam pressure or water temperature must be maintained relatively constant. As previously noted, a generator is brought on line in response to a detected drop in steam pressure or water temperature which indicates that the steam or hot water load has increased. If a forced flow type generator is used, there will be a typically worst case five minute delay before an off line generator can be brought on line and brought up to maximum firing rate (assuming that the drop in steam pressure is sufficiently great to require a maximum firing rate). If a conventional fire tube (drum) boiler is used, the delay could be an hour or more. During this delay, the steam pressure or water temperature will continue to drop below the nominal value. Accordingly, the steam pressure or water temperature will deviate significantly from the desired nominal value.

A second shortcoming of the above-described prior art control apparatus becomes apparent in situations wherein the steam/hot water load momentarily decreases thereby causing a short duration increase in steam pressure or water temperature. Ideally, the temporary decrease in load would be ignored and all generators on line would remain on line. However, the prior art control apparatus will detect the drop in load and may cause one or more generators to be taken off line. When the temporary decrease in steam or hot water load is over, the steam pressure will drop, or the temperature will drop so that the generators which were taken off line will be again needed. However, the pressure or temperature will remain significantly below the desired nominal value until the generator has been brought back on line.

The present invention overcomes the above-described limitations of the prior art controllers. Rather than rely solely upon the measured load for controlling the generators, apparatus is provided for predicting anticipated changes in loads. By way of example, if an increase in load is predicted, one or more generators can be brought on line prior to such increase. Thus, the generators will be able to meet the increase in demand in a relatively short period of time (typically thirty seconds) so that the steam pressure or water temperature will not deviate significantly from the desired nominal value. Similarly, should there be an unanticipated temporary decrease in load, the present invention will cause the generators to remain on line. Accordingly, when the steam or hot water load returns to normal, the generators will be able to rapidly meeet the increase in load without any significant drop in steam pressure or water temperature.

The present invention possesses the above-described advantages over the prior art in addition to having further advantages as will be apparent from the following detailed description.

SUMMARY OF THE INVENTION

A control apparatus for controlling the generators of a multiple steam generator or a multiple hot water generator installation is disclosed. The subject control apparatus includes burner modulating apparatus for controlling the firing rate of each of the generators in response to the actual measured steam/hot water load. Further included is burner command apparatus for limiting the firing rate of each of the generators to one of at least two different maximum firing rates.

The burner command apparatus is controlled by a processing unit, such as a microcomputer, which provides data which corresponds to the predicted load for the installation over a period of time. Thus, the actual firing rate of each of the generators of the installation will be determined by both the predicted load data which corresponds to the predicted load for the installation and the actual load conditions.

BRIEF DESCRIPTION OF THE DRAWINGS

FIG. 3 shows a graph which shows the thermal efficiency of forced-flow type and fire tube (drum) type steam generators.

FIG. 5A shows a schematic representation of the generator status for various burner command switch states.

FIG. 5B is a chart showing the generator status for various burner command switch states.

FIG. 6A shows an exemplary Load Table for a two generator installation.

FIG. 6B shows an exemplary Load Table for a three generator installation.

FIG. 6C shows an exemplary Load Table for a four generator installation.

FIG. 7B shows an exemplary Day Sequence Table.

FIG. 19 is a state diagram which shows the possible states of a generator controlled by the subject invention.

FIG. 20 is a table which sets forth the possible states of a generator controlled by the subject invention.

FIG. 21 is a graph which illustrates the operation of the Load Heating Management function of the subject invention.

FIG. 22 is a table which sets forth the nominal accumulated steam trap open times for various operating conditions.

DETAILED DESCRIPTION OF THE INVENTION

Figure 1A:
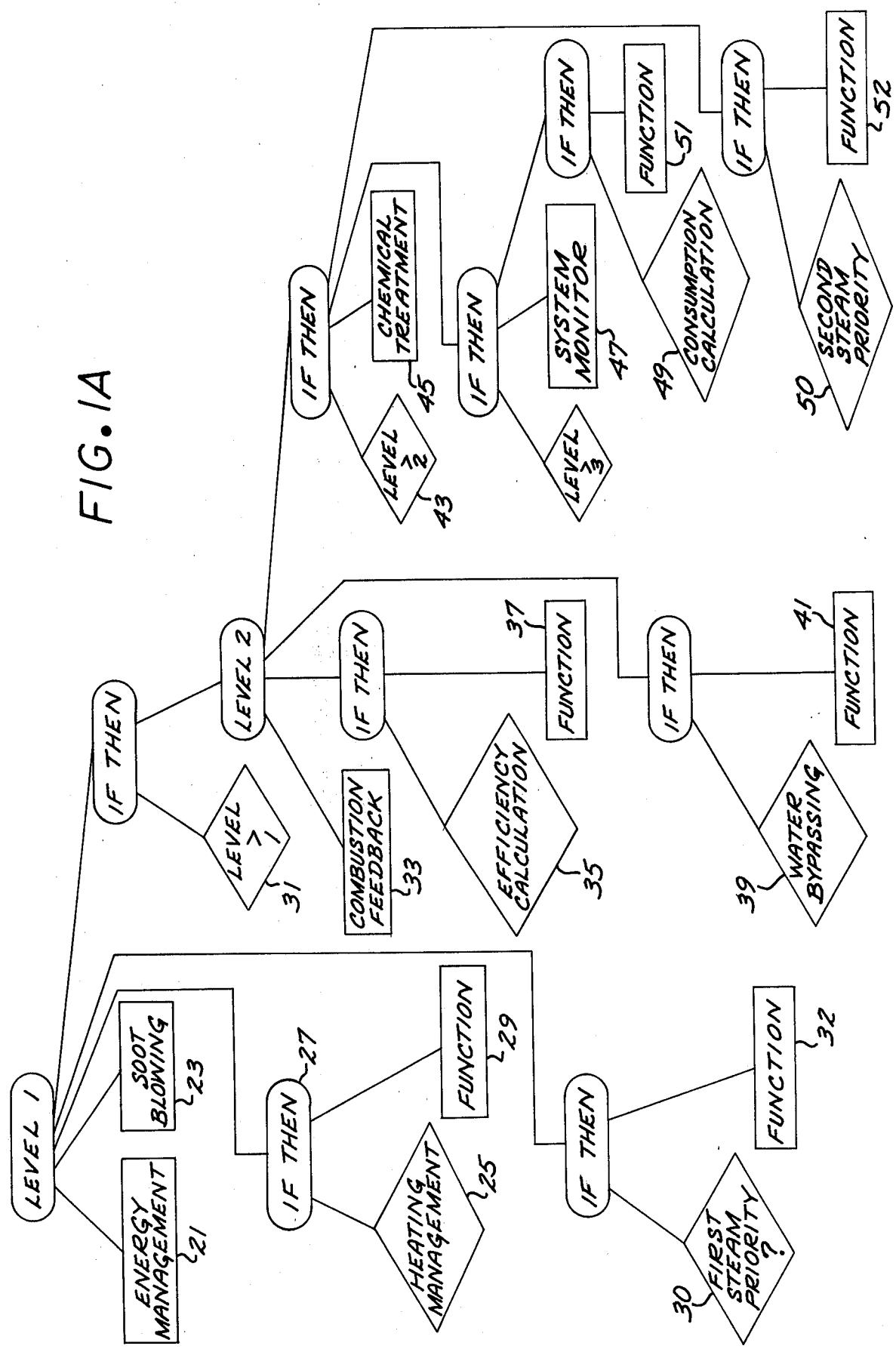
FIGS. 1A and 1B are simplified flow charts which illustrate various embodiments of the subject invention.

Referring now to the drawings, FIG. 1A shows a simplified flow chart which illustrates four of the five commercial embodiments of the subject invention. Only a brief overview of the flow chart will be given with the various blocks which comprise the chart being subsequently described in greater detail.

The level 1 or first embodiment of the present invention is the basic embodiment and includes the energy management feature as represented by block 21 and the soot blowing feature as represented by block 23. The level 1 embodiment may also include, as an option, a heating management feature represented by block 25. If the heating management feature is included in the level 1 embodiment, then as indicated by block 27, heating management apparatus as represented by block 29 is provided for carrying out this function. Finally, the first embodiment may include, as an option, apparatus for executing a first steam priority functin as represented by block 30. As will be subsequently described, the first steam priority function permits certain predetermined lowest priority steam loads to be automatically disconnected or shed should the steam pressure suddenly drop a predetermined amount. If the first steam priority function is included in the first embodiment, apparatus is included for carrying out the function as indicated by block 32.

The level 2 or second embodiment of the present invention provides all of the features of the first embodiment of the subject invention in addition to providing further features. Referring again to FIG. 1A, if the level is greater than level 1 (such as level 2) as indicated by block 31, combustion feedback apparatus is provided, as represented by block 33, for controlling the excess air of combustion. The second embodiment also includes an optional efficiency calculating feature represented by block 35. If this option is included, then apparatus, as represented by block 37, is provided for carrying out this function. Level 2 also includes a second optional feature, namely, a water bypass trimming feature as represented by block 39. If this second option is included, then apparatus, as represented by block 41, is provided for performing the bypass function.

The level 3 or second embodiment of the present invention provides all of the features of the level 2 embodiment in addition to providing a further feature. As can be seen in FIG. 1A, all levels greater than level 2 (see block 43), such as level 3, include a chemical treatment feature as represented by block 45.

The level 4 of fourth emobidment provides all of the features of the level 3 or third embodiment of the invention. In addition, level 4 includes a system monitor feature as represented by block 47. Level 4 also includes an optional consumption calculation feature as indicated by block 49. As will be subsequently described, this feature permits the total cost of producing steam on a per unit basis to be determined. If the consumption calculation option is included, apparatus, as represented by block 51, for performing this function is included. The fourth emobidment may further include, as an option, apparatus for performing a second steam priority function as indicated by block 50. This apparatus, which is similar to the first steam priority apparatus 30 of level 1, causes certain predetermined intermediate priority steam loads to be automatically disconnected or shed in the event the steam pressure drops a predetermined amount.

Figure 1B:
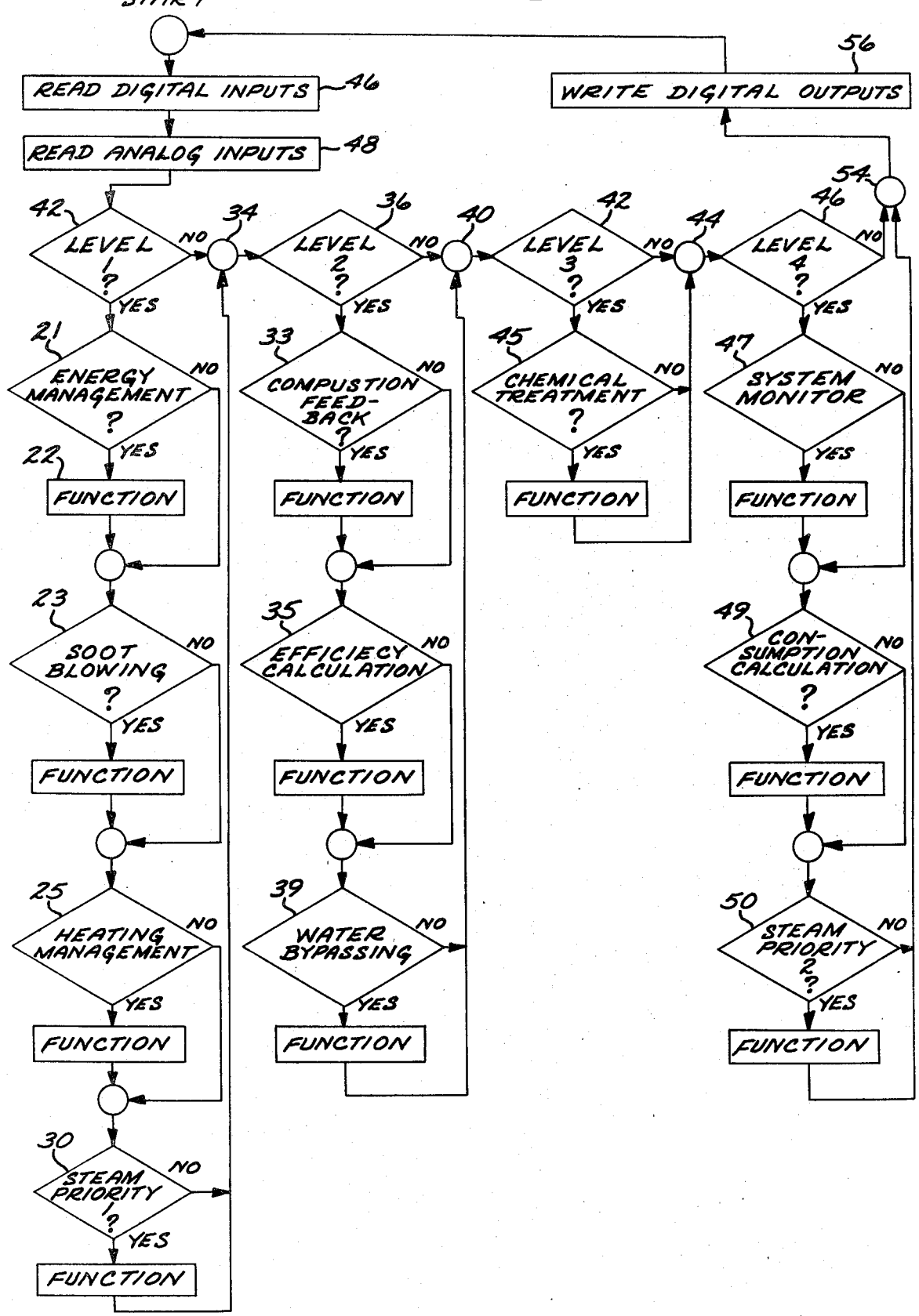

FIG. 1B shows a simplified flow chart of a computer program which illustrates the operating of a fifth and preferred embodiment of the subject invention. The fifth embodiment permits the user to select any combination of features previously described in conjunction with the first four embodiments.

As shown in the chart of FIG. 1B, the program will proceed to block 42 once various digital and analog inputs, which will be subsequently described, have been read as indicated by blocks 46 and 48. At block 42 a determination is made as to whether any of the level 1 features have been incorporated into the system. As previously noted, such features include the energy management feature (block 21), the soot blowing feature (block 23) and so forth. If any of the level 1 features are incorporated, the program will proceed to block 21 at which time a determination wil be made as to whether the energy management feature is included. If this feature is included, the program will advance to block 22, at which time the energy management function will be carried out. If the energy management feature has not been incorporated into the system or the energy management function has been completed, the program will then proceed to block 23. At block 23, a determination will be made as to whether the system is provided with the soot blowing feature. This process is continued until all of the level 1 functions which are included in the system have been completed.

If the system does not include any of the level 1 functions or if all of the level 1 functions have been completed, the program will proceed to block 34 and then to block 36. At block 36, a determination will be made as to whether the system is provided with any of the level 2 features such as the combustion feedback or the efficiency calculation features. If level 2 features are included, the program will proceed to block 33 and then to subsequent blocks in the same manner as previously described in conjunction with level 1.

If the system does not include any of the level 2 features, or if all of the level 2 functions have been completed, the program will proceed to block 40 and then to block 42. At block 42 a determination is made as to whether the level 3 feature (chemical treatment) is included in the system. If so, the level 3 function is carried out and the program will proceed to block 44 and then to block 46. If the level 3 function is not included, the program will proceed directly to block 46. At block 46, a determination will be made as to whether any of the level 4 features are included in the system. If not, the program will proceed directly to block 54. If one or more level 4 features are included, the program will proceed to block 54 once the appropriate functions have been carried out. From block 54, the program will proceed to block at which time varius outputs regarding the status of the installation will be displayed as will be subsequently described. The program will then proceed to blocks 46 and 48 at which time the various input signals will be read a second time. The previously described process will then be repeated. Although the fifth embodiment has just been described as a sequential process, because of the short time required to go through a complete cycle, operation of the functions is effectively concurrent.

Figure 2:
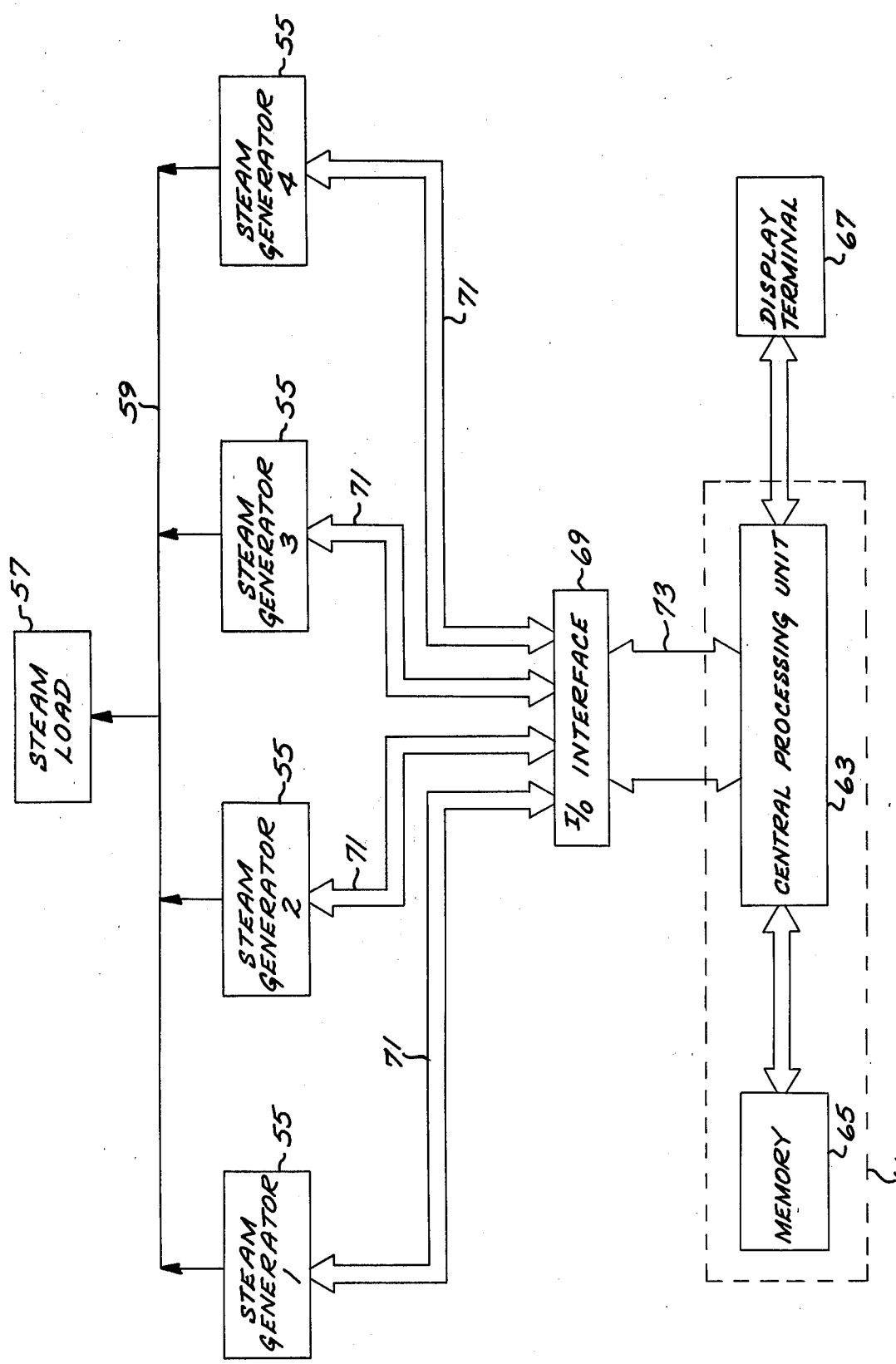
FIG. 2 shows a simplified block diagram of an exemplary multiple steam generator installation utilizing the subject invention.

FIG. 2 shows a simplified block diagram of an exemplary multiple steam generator installation utilizing the subject invention. The system includes 4 steam generators 55 which provide steam to a common steam load 57 by way of header 59. Although 4 steam generators are shown, the subject invention can be readily adapted to control installations having 2 or more generators.

The system includes a suitably programmed conventional microcomputer 61 having a central processing unit (CPU) 63 and a memory 65. Memory 65 is comprised of a read-only memory section (ROM) and a random-access memory (RAM) section. Although not required, it is preferable that at least one display terminal 63 be provided for displaying various information including information regarding the status of each of the steam generators. Most of the functions provided by the subject invention are controlled by microcomputer 61. Although the microcomputer must obviously be appropriately programmed, it is believed that a detailed description of the program is not required in order to enable one having ordinary skill in the computer programing art to make and use the subject invention. Accordingly a detailed description of the computer program will not be given so as not to obscure the true nature of the invention in unnecessary detail.

An I/O Interface Circuit 69 is provided for interfacing between the control and monitoring apparatus associated with each of the steam generators 55 and the microcomputer 61. All of the signals generated by and received by the microcomputer 61 on lines 73 are digital signals whereas many of the signals on the two-way interface line 71 between the steam generators 55 and the Interface Circuit 69 are analog circuits. Accordingly, I/O Interface Circuit 69 includes appropriate digital-to-analog converters for converting certain ones of the digital signals produced by microcomputer 61 to analog signals and analog-to-digital converters for converting those analog signals produced by the apparatus associated with the steam generators 55 to digital signals.

Although the subject invention can be utilized in conjunction with a wide variety of steam generators and boilers, the invention has been found to be particularly suitable for use with forced flow type generators such as the Model EOG-500 generator manufactured by the Clayton Manufacturing Company of El Monte, Calif. Unlike conventional water-tube or fire-tube (drum type) boilers, a forced-flow steam generator contains only a relatively small mass of steel and water (the terms boiler and generator are used interchangeably herein). Thus, a forced-flow generator can be fired from a cold start to at least 95% of rated output within 5 minutes as compared to a one hour startup period for a conventional boiler. In addition, forced-flow steam generators maintain a much higher efficiency at low firing rates as compared to conventional drum type boilers. As can be seen by the efficiency curves of FIG. 3, the thermal efficiency of a conventional drum boiler peaks at 80% of maximum output and drops off to approximately 65% at 20% of output. The thermal efficiency of a forced flow type generator, on the other hand, is near maximum (about 85%) at 20% of output and drops off to approximately 75% at 10% of maximum output. The overall efficiency of both the drum boiler and forced-flow type generator takes into account total energy consumption (including electrical and compressed air consumption) and is somewhat lower than thermal efficiency, especially at lower firing rates. For example, the overall efficiency of the forced flow type generator begins to drop off below 40% of maximum output, therefore operation below this point is generally not desirable. As will become apparent, the high-efficiency operation of the forced flow generator over a broad band of operation together with the rapid start-up capabilities of such generators is highly advantageous when used in conjunction with the subject invention.

Figure 4A:
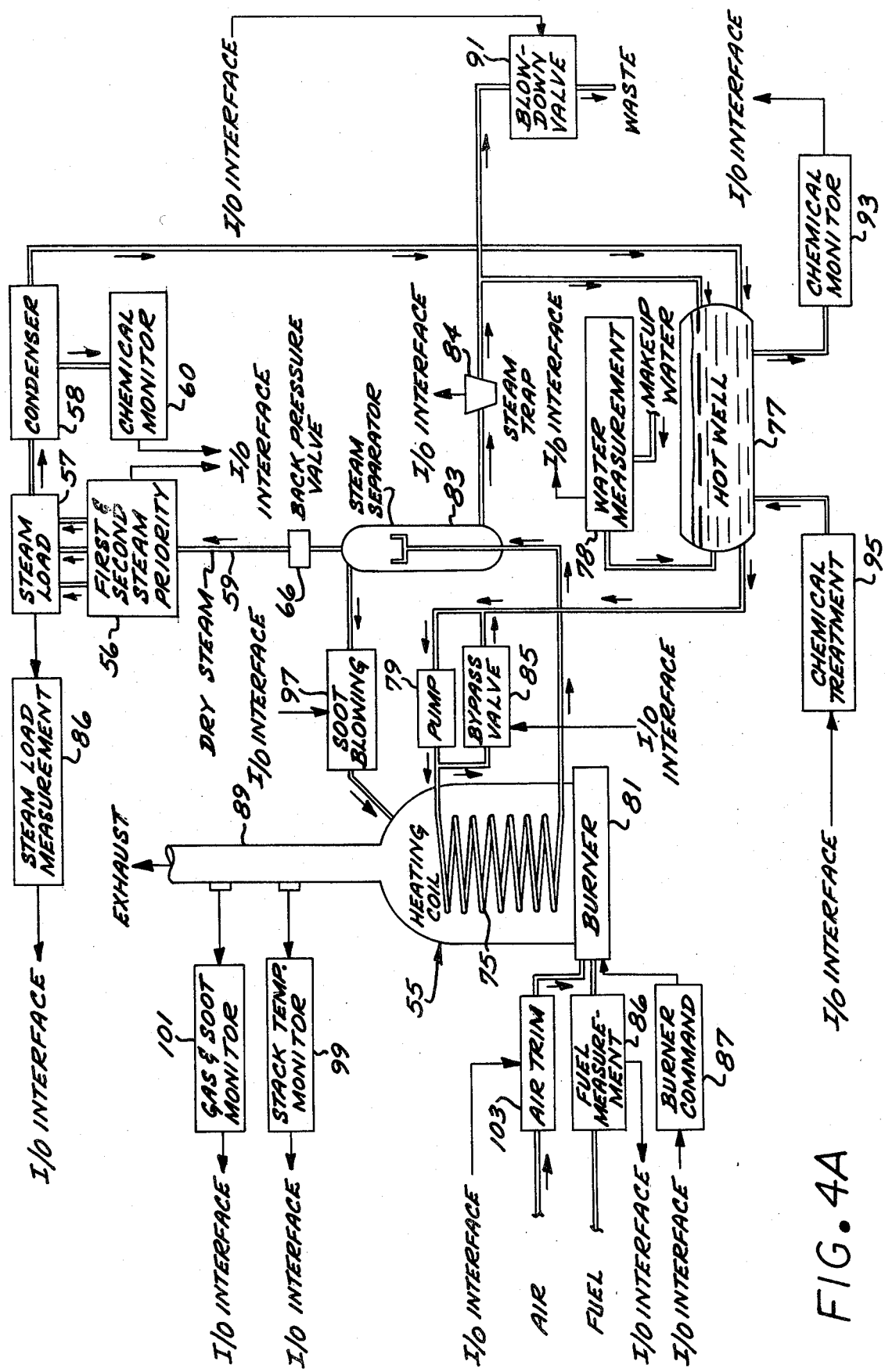
FIG. 4A shows a simplified schematic representation of a steam generator installation utilizing the subject invention.

FIG. 4A is a simplified schematic representation of a forced-flow type generator 55 together with the associated monitoring and control apparatus required for carrying out each of the previously described fifth embodiment functions. (Many of the steam generator 55 details which do not relate to the subject invention have been deleted so as not to obscure the invention.) Generator 55 includes a single pass mono-tube heating coil 75 which receives feed water from a hotwell 77 via a fixed rate feedwater pump 79. The feedwater is pumped through the coil and heated by the generator burner section 81 so as to produce a steam/water mixture. The burner may be fueled by either oil (either heavy or light oil) or gas. The amount of fuel consumed by the generator is measured by conventional fuel measurement apparatus 86. The measurement apparatus is coupled to microcomputer 61 via the I/O Interface.

The steam/water mixture exits the lower end of coil 75 and is conducted to a conventional high velocity centrifugal steam separator 83 which separates the steam from the water. The dry steam output of the separator is conducted to the steam header 59 through a conventional back pressure valve 66. Valve 66 remains closed during the initial stages of a cold start when the steam pressure output of separator 83 is low. Once the steam pressure output reaches a predetermined level, valve 66 will open thereby permitting steam flow through header 59. Although not shown, the remaining steam generators are also coupled to the header. Apparatus 56 for carrying out the first and second steam priority functions is displaced between the output of the header 59 and the steam load 57. The first and second steam priority apparatus is controlled by the microcomputer 61 via the I/O Interface Circuit.

The excess water from the steam separator 83 is returned to the hotwell 77 through a conventional steam trap 84. As will be subsequently described in greater detail, a certain amount of excess water is required to ensure that the dissolved solids are carried through the heating coil 75 to the hotwell 77. As will also be subsequently described, steam trap 84 provides a signal to the I/O Interface which permits the quantity of excess water exiting the trap for a given time period to be calculated.

A condenser 58 is coupled to the return side of the steam load. The condensate produced by condenser 58 is returned to hotwell 77 for further steam production. In addition, any water lost in the system (which may be either closed or open loop) is replaced from a source of makeup water. Water measurement apparatus 78 is provided so that the amount of water consumed in the installation may be determined. The water measurement apparatus output is coupled to the microcomputer 61 via the I/O Interface.

Generator 55 is also equipped with a blowdown valve 91 to control the concentration of dissolved solids. Valve 91 is situated such that it will discharge to waste water from the generator system which has the highest concentration of dissolved solids. The blowdown operation can be performed either automatically or in response to a command via the I/O Interface Circuit 69, as will be subsequently described.

As previously noted, the fifth embodiment of the subject invention may also include apparatus for controlling the chemical makeup of the feedwater. Chemical monitor apparatus 93 is provided for measuring the total amount of dissolved solids (TDS) in the feedwater located in hotwell 77 in addition to measuring the water hardness, the sulfite concentration and the pH. The outputs of monitor 93 are coupled to the microcomputer 61 via the I/O Interface 69. A second chemical monitor 60 is provided which is coupled to condenser 58. Monitor 60 serves to measure the pH and TDS of the condensate returned from the steam load. As will be subsequently described in greater detail, chemical treatment apparatus 95 is provided for chemically treating the feedwater. Such apparatus is controlled by microcomputer 61 via the I/O Interface in response to the output of chemical monitors 93 and 60.

In order to eliminate or reduce the amount of soot buildup on the generator heating coil 75, the level 5 embodiment may further include soot blowing apparatus 97 which is controlled by the microcomputer 61. The soot blowing apparatus periodically directs high pressure steam provided by steam separator 83 over the heating coil so as to blow away at least part of the soot buildup. In addition, stack temperature monitoring equipment 99 is provided for measuring the temperature of the stack exhaust gases. A conventional gas and soot monitor 101 is also provided. This monitor is used for measuring the concentration of CO, $CO_2$, (or $O_2$), $NO_x$ and soot in the exhaust gases. The outputs of both the temperature monitor 99 and the gas and soot monitor 101 are coupled to the microcomputer 61 by way of the I/O Interface Circuit 69.

The fifth embodiment of the subject may further include an air trim device 103 controlled by the microcomputer 61 via the I/O Interface circuit 69. As will be subsequently described, the air trim device 103 permits the excess air of combustion to be precisely controlled in accordance with the concentration of CO, $O_2$ and/or $CO_2$ in the exhaust gases as measured by gas and soot monitor 101.

Generator 55 further includes a conventional internal modulating apparatus (not shown) which is the primary control for the generator combustion air, fuel and heating coil water. The modulating apparatus varies the quantity of combustion air, fuel and water in response to the steam load of the generator 55. The steam load is typically determined from the measured steam pressure at the output of the steam separator 83. The steam pressure will vary over a relatively narrow modulating band depending upon the steam load. Thus, for a high steam load the pressure will fall within the lower portion of the modulating band and for a low steam load the pressure will increase to the upper portion of the band.

The quantity of water pumped through heating coil 75 is controlled by a bypass valve 85 which is in turn primarily controlled by the internal generator modulating apparatus. At low steam output, bypass valve 85 is almost completely opened so as to shunt almost all of the water output of pump 79 around the heating coil 75. At high outputs, valve 85 is nearly closed so that almost all of the water output of pump 79 passes through heating coil 75 to be converted to steam. As will be subsequently described, bypass valve 85 may also be controlled by microcomputer 61 via the I/O Interface circuit 69.

The actual burner firing rate is controlled by the previously noted internal modulating apparatus in accordance with the measured steam load. However, the maximum permitted burner firing rate is controlled by a microcomputer controlled burner command apparatus 87. The burner is commanded by three switches which are represented schematically in FIG. 5A as normally-closed switches a, b and c which are coupled across series-connected resistors $R_a$, $R_b$ and $R_c$, respectively. The Generator Status Table of FIG. 5B shows the status of the generator depending upon the position of the switches. A generator status of "0" indicates that the generator is shut off. When the generator if off, all three normally-closed switches are commanded to an open, i.e., actuated, as represented by the numeral "1".

If the generator status is "1", then the generator is released to a maximum output of 20% and all three switches are actuated. If switches a and b are the only switches actuated, then the generator is released to a maximum output of 60%. At a 60% output, the generator status is "2". If switch a is the only burner command switch actuated, the generator status is "3" and the maximum burner output is limited to 80% of maximum. Finally, if none of the three burner switches are actuated, the table of FIG. 5B indicates that the burner will be released to full capacity, i.e., 100%. At a 100% maximum firing rate, the generator status is "4".

Figure 23:
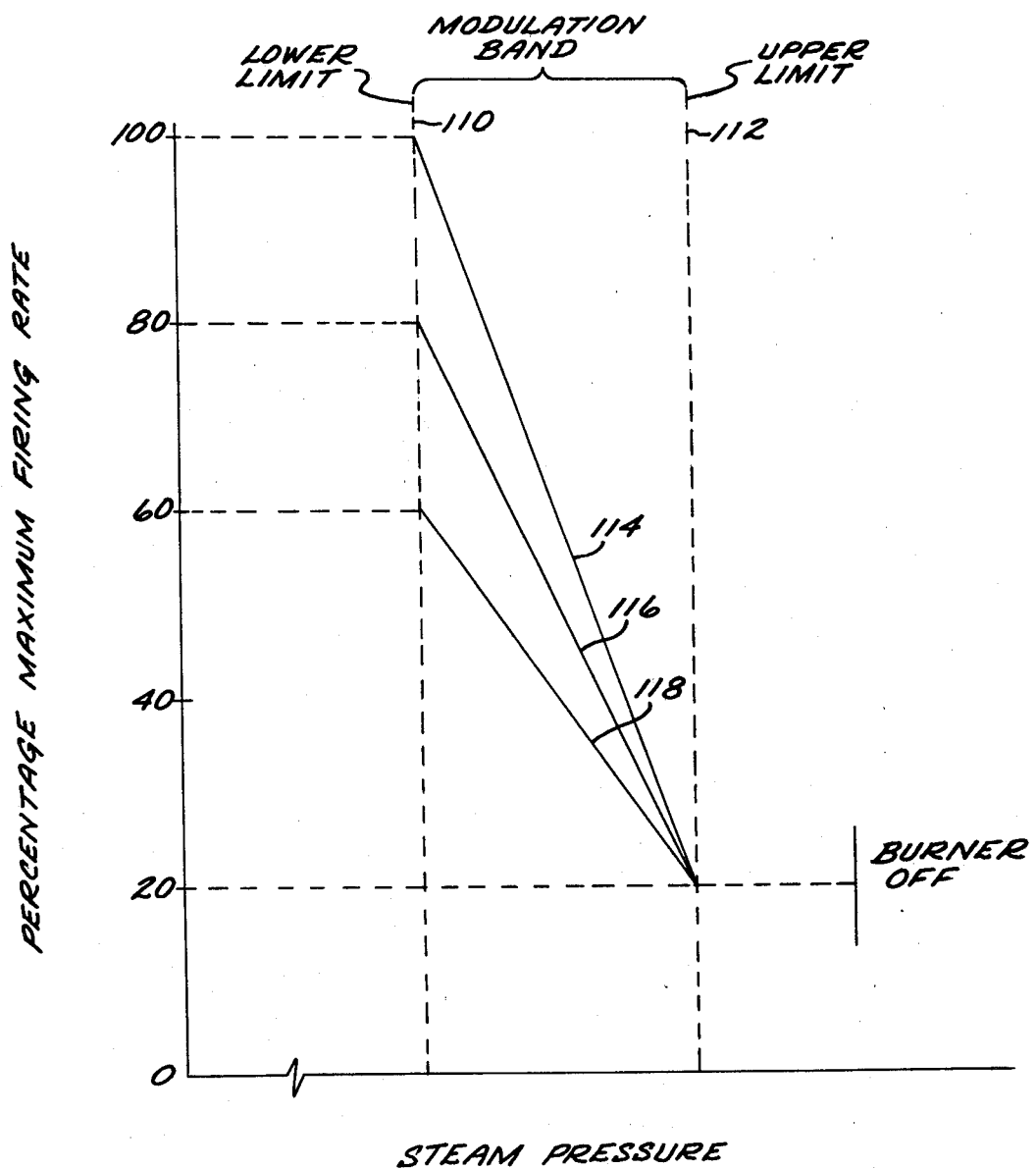
FIG. 23 is a graph which illustrates the operation of the modulating apparatus of a generator controlled by the subject invention.

A graph illustrating the operation of the generator burner may be seen in FIG. 23. The vertical axis represents the percentage maximum firing rate and the horizontal axis represents the measured steam pressure which is indicative of steam load. The steam pressure is permitted to modulate within a relatively narrow modulation band defined by a lower pressure limit 110 and an upper limit 112.

If the burner is commanded to a status of "4", the burner is released to a maximum 100% firing rate. In that event, the burner will modulate along curve 114 of FIG. 23 between a maximum rate of 100% (when the steam pressure is at the lower limit 110) to a minimum of 20% (when the steam pressure is at the upper limit 112). If the burner status is "3", the burner will modulate along curve 116 between a maximum firing rate of 80% and a minimum firing rate of 20%. Similarly, if the burner status is "2", the burner will modulate along curve 118 between a maximum firing rate of 60% and a minimum firing rate of 20%. Finally, if the status is "1", the burner will remain at a fixed 20% of maximum firing rate if the steam pressure is at the lower limit 110. Should the steam pressure increase above the lower limit, the burner will be cycled on and off so as thereby achieving an effective firing rate between 0% and 20%. By way of example, a 50% duty cycle will produce an effective 10% of maximum firing rate.

Figure 4B:
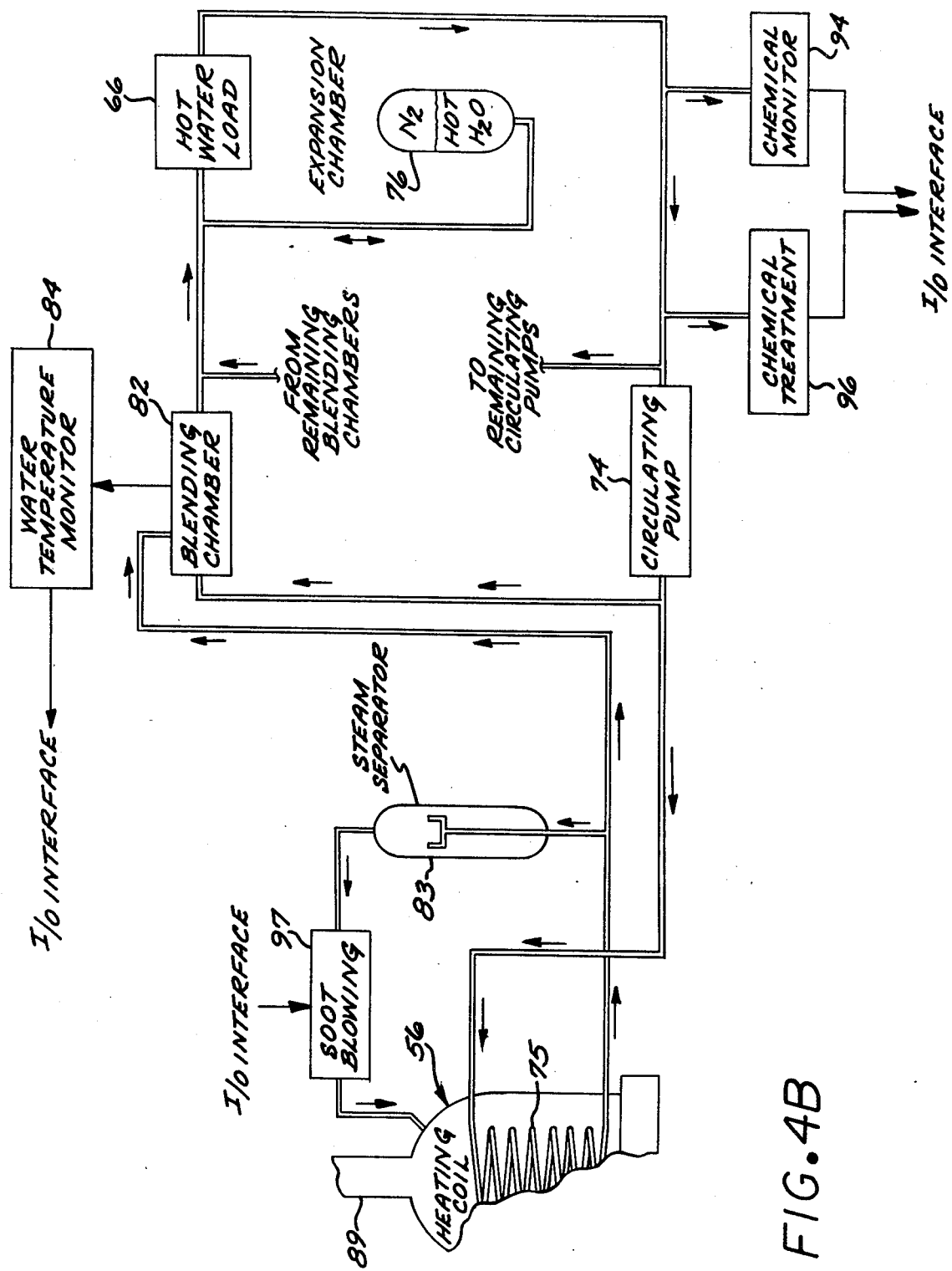
FIG. 4B shows a simplified schematic representation of a hot water generator installation utilizing the subject invention.

With few exceptions, all embodiments of the subject invention are applicable to installations which produce hot water, which is typically used for heating purposes, rather than steam. FIG. 4B shows part of a typical hot water generator utilizing the subject invention. The hot water generator is very similar to the steam generator with the primary distinction being that the internal modulating apparatus is responsive to the output water temperature, as measured by temperature monitor 84, rather than steam pressure (steam load).

Each generator of the installation includes a circulating pump which receives water from the hot water load 66. A fraction of this water is pumped through the heating coil 75 and is heated by the generator burner (not shown). The hot water generator heating coil 75 and the burner are identical to the coil and burner of the FIG. 4A steam generator.

The heated steam/water mixture which exits the heating coil 75 is conducted to a blending chamber 82 which combines the mixture with the remaining fraction of the warm water from the hot water load. In addition, blending chamber 82 serves to condense the steam. The output of heating coil 75 is also connected to a steam separator 83 which provides steam for a microcomputer controlled soot blowing apparatus.

The hot water output of the blending chamber 82 together with the outputs of the chambers of the remaining generators of the installation are conducted to the hot water load 66. A nitrogen filled expansion chamber 76 is connected in parallel with the load and serves to stabilize the pressure of the system. A conventional chemical monitor 94, similar to the chemical monitor 93 of FIG. 4A, is provided for monitoring the chemical makeup of the water returned from the load. In addition, chemical treatment apparatus 96, similar to the chemical treatment apparatus 95 of FIG. 4A, is provided for treating the hot water used in the closed loop system.

Unless stated otherwise, the various features of the subject invention have equal application to both steam and hot water generator installations. Due to the similarity of the two types of generators, the subject invention will be described primarily in reference to steam generators.

Energy Management

One of the primary objectives of the energy management feature of the subject invention is to control the status, including the maximum firing rate, of each of the generators for any given load condition to as to maximize the overall efficiency of the system.

Load Tables 111 of FIGS. 6A–6C are used to control the status of each of the generators in an installation in accordance with the Load Index (or Load Level). Generally, each generator is assigned a status for a particular Load Index which will optimize the overall efficiency of the installation for that particular load condition. As can be seen by the efficiency curves of FIG. 3, the efficiency of a forced flow type generator is significantly reduced when it is operated below 20% output and the efficiency of a fire tube (drum) boiler is significantly reduced when it is operated below 60% output. As previously noted, the curves of FIG. 3 represent thermal efficiency (rather than overall efficiency) and do not take into account such losses as electrical energy consumption which tend to further reduce the efficiency of the generator or boiler at low outputs. For a force flow type generator, overall efficiency begins to drop off at a much higher output, typically 80% of maximum output. Generally speaking, maximum efficiency for an installation is achieved by first minimizing the number of generators which are on line for a particular load. For example, if 3 generators of a 4 generator system can meet the current load requirements, then only 3 generators should be on line. The fourth generator is preferably shut off rather than placed at a minimum firing rate inasmuch as losses in the latter mode of operation (radiation losses and losses due to energy consumed by peripheral equipment such as water and fuel pumps and air blowers) can be significant with the efficiency approaching 0%. Of course, if the load requirements suddenly increase, it will be necessary to bring the shut off generator back on line. This may be impractical if a conventional boiler is being used since, as previously noted, such boilers typically take approximately one hour to be brought up from a cold start to 95% of output. However, low mass forced flow generators can be brought on line from a cold start to 95% of rated output within 5 minutes, therefore it is practical to shut off such generators if the load requirements should momentarily drop.

In addition to minimizing the number of generators on line for any load conditions, it is preferable to distribute or allocate the load requirements among the generators which are on line in a manner such that the highest efficiency is achieved. For example, in a 3 generator system it is possible that a load can be satisfied with one generator shut off, and the two remaining generators commanded to a maximum firing rate of 100% and 20%, respectively. Although the generators at 100% maximum is at an efficient firing rate, such efficiency will be more than offset by the high inefficiency of the generator at a 20% maximum firing rate. Accordingly, it would be preferable to redistribute the load by reducing the maximum firing rate of the second generator from 100% to 60% and increasing the firing rate of the third generator from 20% to 60%. The total maximum output (120% total) would remain the same as would the efficiency of the second generator since there is little difference in efficiency between a 100% and a 60% firing rate (for a forced flow generator). However, the efficiency of the third generator would increase substantially since a firing rate of 20% or below is relatively inefficient even for a forced flow generator. Accordingly, the overall efficiency of the installation will be increased by the load redistribution.

The Load Tables 111 of FIGS. 6A-6C, which are stored in the microcomputer memory 65, indicate the manner in which a load should be distributed among the generators of a typical multi-generator installation for various load conditions. Of course, the load distribution indicated in the Load Tables 111 of FIGS. 6A-6C are exemplary only. The ideal load distribution for a particular installation will depend upon many factors including the type of generator being used. However, the distribution can be readily determined by selecting a distribution for each load condition which maximizes the overall efficiency of the installation under such load condition.

The Load Table 111 of FIG. 6A is to be used for a typical 2 generator installations with the tables of FIGS. 6B and 6C being suitable for typical 3 and 4 generator installations, respectively. Each table includes 8 possible Load Indexes which represent 8 possible installation load conditions. If greater load resolution is desired, the number of Load Indexes can be increased. Similarly, if less resolution is desired, the number of Load Indexes can be reduced.

A Load Index of 0 represents a no load condition whereas a Load Index of 7 represents a maximum load condition. Tables 111 further include a list of Load Levels which correspond to each Load Index. For a 2 generator installation (FIG. 6A), the Load Level will vary from 0 to 10 for a change in Load Index from 0 to 7. For a 3 generator installation (FIG. 6B), the Load Level will vary from 0 to 15 and for a 4 generator installation (FIG. 6C), the Load Level will vary from 0 to 20 for a Load Index change of the 0 to 7.

Load Tables 111 indicate the manner in which a load is distributed among the generators of an installation for a particular Load Index (or Load Level). By way of example, for a Load Index of 5 (Load Level of 12 to 13), Table III of FIG. 6C indicates that maximum efficiency will be achieved in a typical four generator installation by shutting off 1 of the 4 generates so that only 3 generators will be on line. As shown in the table, generator no. 4 has a status of 0 thereby indicating that the generator is shut off. With respect to the remaining 3 generators, generator no. 1 will be commanded to a status of 4 which means that the generator will be released to a maximum firing rate of 100%. Generator nos. 2 and 3 will both be commanded to a status of 3 which means that these generators will be released to modulate between 0 and 80% of maximum firing rate. If the load should increase so that the Load Index changes from 5 to 6, the Load Table 111 indicates that generator no. 4 will be brought on line and released to a maximum firing rate of 60% which is a change in status from 0 to 2. In addition, the status of generator no. 2 will be increased from 3 to 4, thereby increasing the maximum possible firing rate to 100%.

Figure 7A:
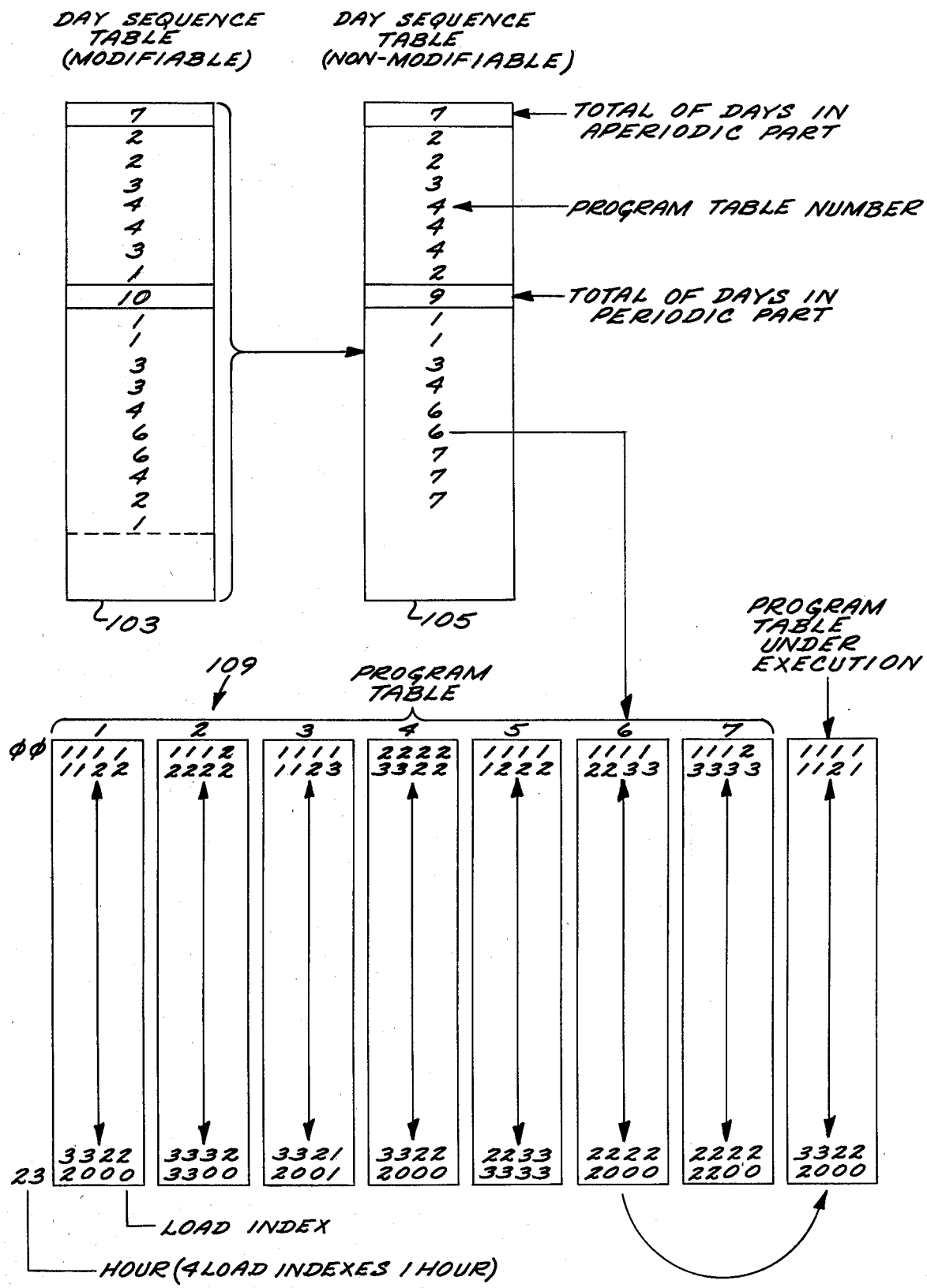
FIG. 7A shows an exemplary Program Table and Day Sequence Table.

The microcomputer memory 65 is also loaded with various Program Tables as shown in FIG. 7A which are collectively designated 109. Each Program Table 109 contains a list predicted Load Indexes for a particular generator installation. A predicted Load Index is provided for each 15 minute period within a 24-hour period, giving a total of 96 Load Indexes. The predicted programmed Load Indexes are based upon the history of the load requirements of the installation for the relevant 24-hour period. If the load requirements of the installation vary the same from day to day, only a single Program Table would be required. It is more likely, however, that the load requirements will in fact vary from day to day. Accordingly, a Program Table must be provided for each 24-hour period having a unique load requirement. FIG. 7A shows a total of 7 Program Tables, which is typical for many installations, with each Program Table being identified by a table number.

Each Program Table is provided with 24 rows of Load Indexes with a row being used during 1 hour of the day. There are 4 Load Indexes in each row or 1 hour period.

As shown in FIG. 7A, the microcomputer memory 61 must also be programmed with two Day Sequence Tables including a modifiable table 103 and a non-modifiable table 105. These tables include a list of Program Table numbers which indicate which of the 7 Program Tables 109 is to be used on a particular day of a sequence. As will be subsequently described, the non-modifiable Day Sequence Table 105 is the table used to execute the program whereas the modifiable Day Sequence Table 103 is the table used for implementing changes. Each of the Day Sequence Tables includes an aperiodic section and a periodic section. The aperiodic section contains a list of Program Table numbers which are to be used only once in a particular sequence. For example, if a plant is to be shut down once a year for a week, the aperiodic section may contain 7 Program Table numbers which are to be used once for each day of the shut down period. The periodic section, on the other hand, contains a list of Program Table numbers which are to be used after the aperiodic portion of the sequence has been completed. The periodic portion of the sequence will be repeated unless an operator effects a change by reprogramming.

Both the modifiable and the non-modifiable Day Sequence Tables have a similar format. The first number in the table represents the total number of days in the aperiodic portion of the table. By way of example, the non-modifiable Day Sequence Table 105 of FIG. 7A shows that there are 7 days in the aperiodic portion. The next group of numbers represents the Program Table number for each day of the aperiodic sequence. In the exemplary non-modifiable Day Sequence Table 105 of FIG. 7A, the group contains 7 Program Table numbers with the table number 2 being selected for the first day of the sequence. The next number in the table following the last aperiodic table number represents the total number of days in the periodic portion of the table. In the exemplary non-modifiable table 105 of FIG. 7A, the number 9 indicates that there are 9 days in the periodic sequence. The next group of numbers represents the Program Table numbers for the periodic portion of the sequence. In the present example, this group contains 9 numbers with Program Table number 1 being the table selected for the first day of the sequence. At the end of the last (ninth) day of the periodic portion of the table, the program returns to the beginning of the periodic portion and continues to repeat the sequence. Accordingly, on the tenth day of the periodic portion of the sequence, Program Table number 1 will be again selected.

FIG. 7B shows a Day Sequence Table 104 which is a variation of the Day Sequence Tables 103 and 105, but which accomplishes the same result and which provides greater flexibility. Table 104 also contains a periodic and an aperiodic section. There are 21 numbers in each section with each number representing the number of a Program Table to be used for one day. The aperiodic section contains all of the Program Table numbers to be used during the first 21 days of the sequence. The periodic section contains all of the Program Table numbers to be used during the second and subsequent 21 day periods. Thus, those days wherein the number in the aperiodic section is not the same as the corresponding number in the periodic section represent what can be termed the aperiodic days.

During the first day of the 21 day period, the first number of the aperiodic section is read and the corresponding Program Table is selected. In addition, the first number of the aperiodic section is replaced with the first number of the periodic section. On the second day, the second number of the aperiodic section is used and the corresponding Program Table is selected. In addition, the second number of the aperiodic section is replaced with the second number of the periodic section. This process is continued until the end of the 21st day of the sequence at which time all of the Program Table numbers in the periodic section will have been written into the aperiodic section. The above-described sequence is repeated during the second and subsequent 21 day periods. The only difference is that all of the aperiodic Program Table numbers in the aperiodic section have been replaced with the periodic numbers. For example, during the third day of the first 21 day sequence, Program Table number 2 will be selected. During the third day of the second and subsequent 21 day sequences, Program Table number 3 will be selected.

Microcomputer 61 can be readily reprogrammed in the event the predicted Load Indexes for a particular day are to be changed. Changes can be implemented by reprogramming one or more of the Program Tables. In most instances, however, it is perferable to alter a sequence by reprogramming the modifiable Day Sequence Table 103. The modifiable Day Sequence Table 103 is periodically compared with the nonmodifiable Table 105. If the modifiable table has been changed, a difference between the tables will be detected and the contents of the modifiable table will be transferred into the nonmodifiable table, preferably at midnight. Once the transfer takes place, the new sequence is initiated. (The same process will take place if the modifiable and non-modifiable tables are implemented in the same manner as the Day Sequence Table 104 of FIG. 7B).

Figure 8:
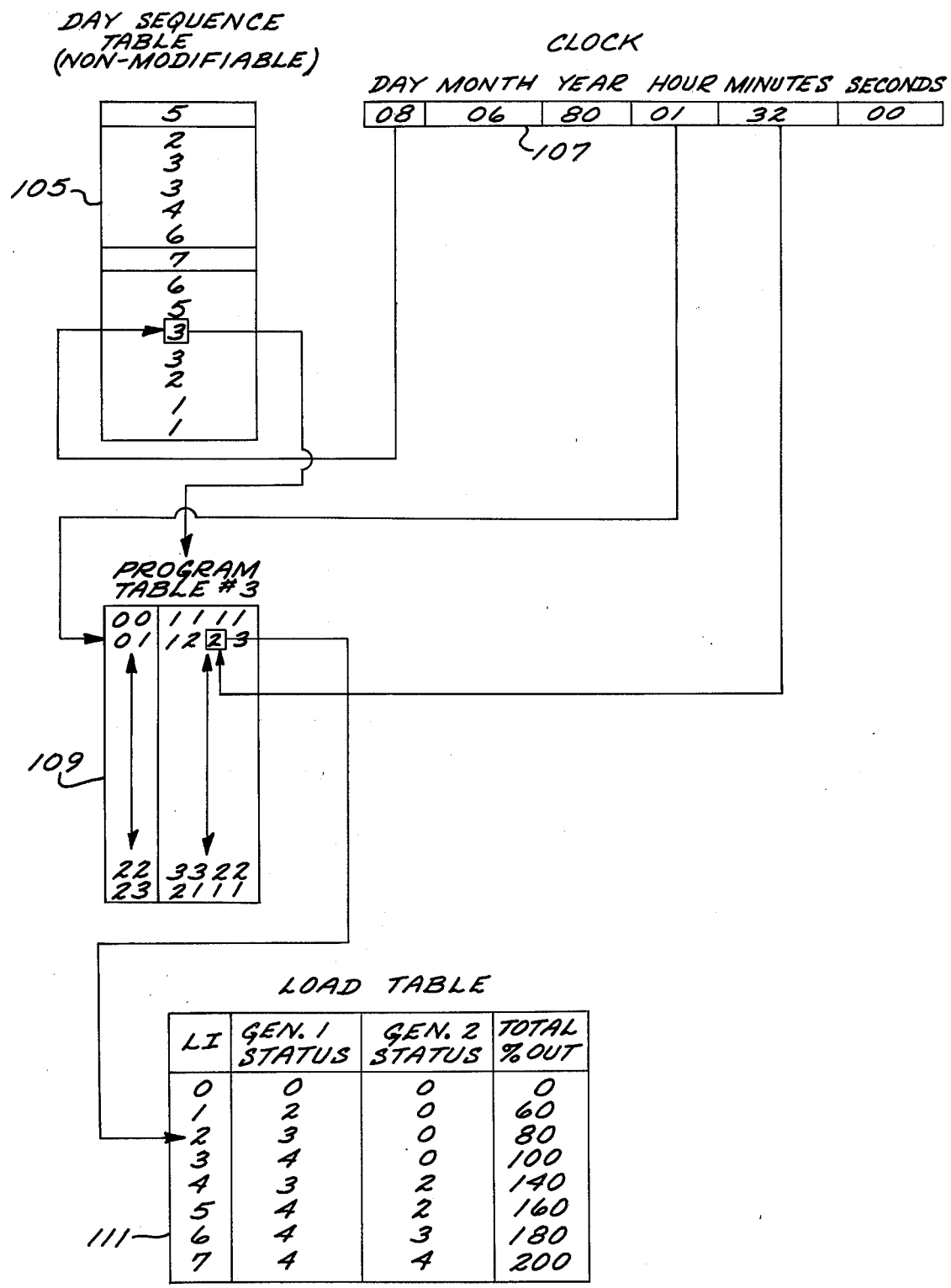
FIG. 8 illustrates the combined operation of the Day Sequence Table, the Program Table and the Load Table.

FIG. 8 illustrates an exemplary energy management sequence for a two generator installation. The sequence is controlled by a digital clock 107 which generates signals which corresponds to real time including the year, month, day, hour, minutes and seconds. Clock 107 shows that the present date is June 8, 1980 or 08/06/80. Assuming that the sequence began on 01/06/80, the sequence would be in its eighth day having passed through the 5 days of the aperiodic portion of the Day Sequence Table. This process will continue unless the user changes the program.

Figure 24A:
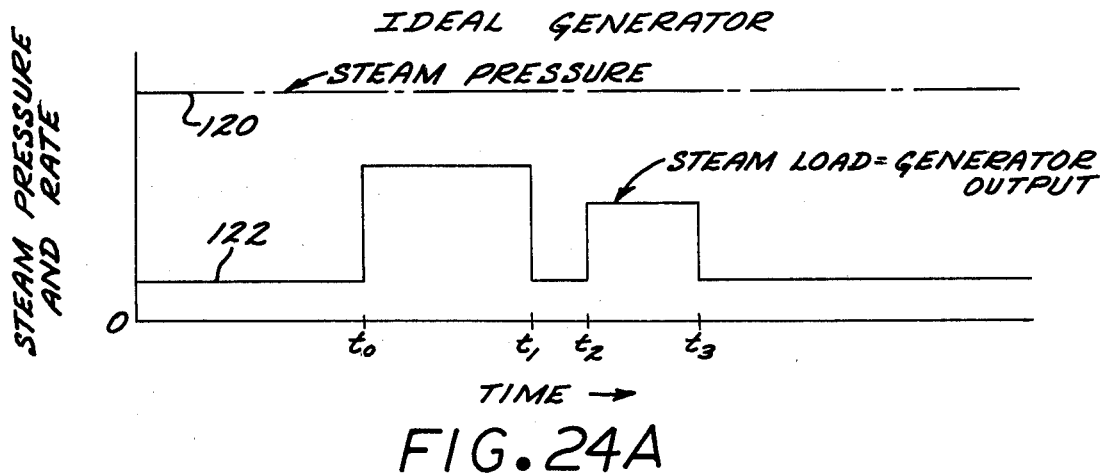
FIG. 24A is a graph which illustrates the operation of an ideal steam generator under typical steam load conditions.
Figure 24B:
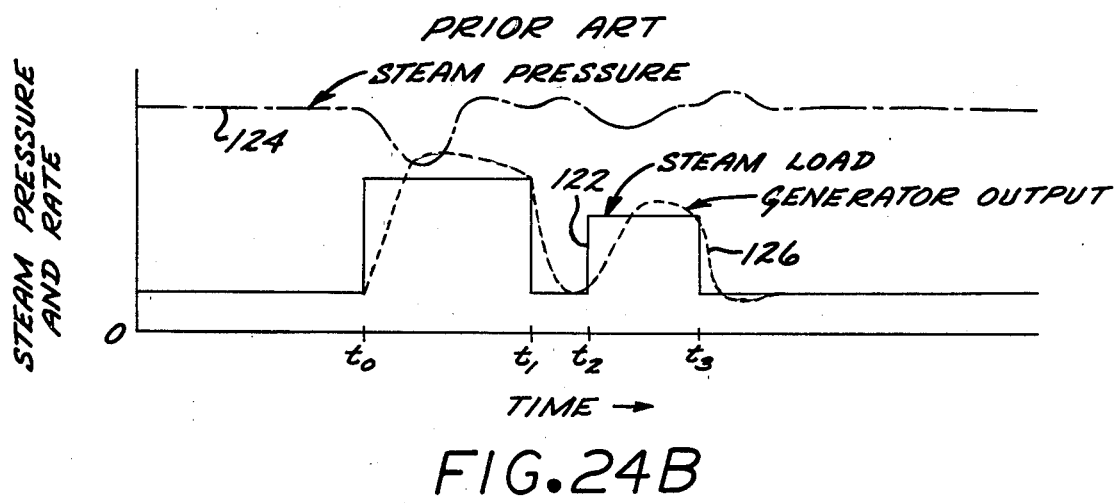
FIG. 24B is a graph which illustrates the operation of a prior art generator control apparatus under typical steam load conditions.
Figure 24C:
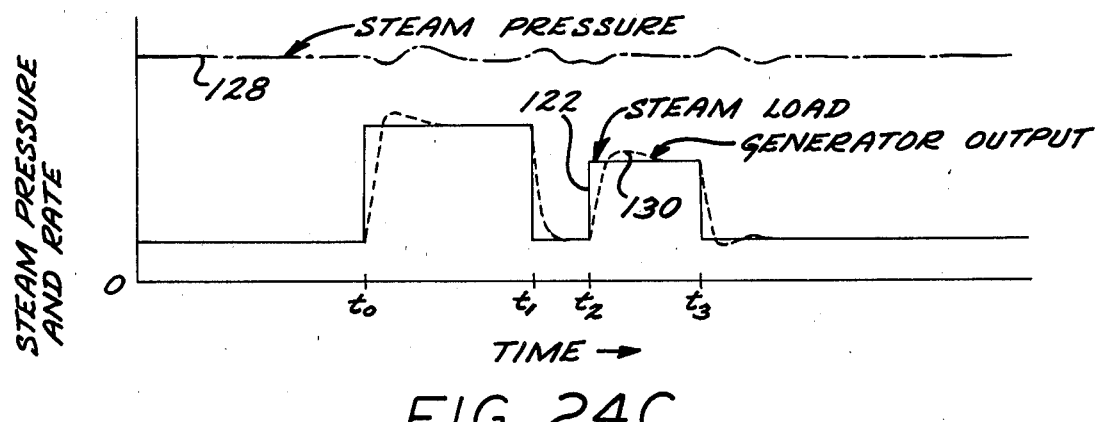
FIG. 24C is a graph which illustrates the operation of the subject invention under typical steam load conditions.

By anticipating changes in steam loads, the performance and installation is greatly enhanced, especially in applications wherein the steam pressure must remain relatively constant despite rapid changes in steam load. FIG. 24A, 24B and 24C show steam pressure curves and steam generator output curves for an ideal generator installation, a prior art installation and an installation controlled by the subject invention, resepectively.

The vertical axes of FIGS. 24A, 24B and 24C represent the magnitude of the steam pressure and steam output and the horizontal axes represent time. It is to be emphasized that the curves of FIGS. 24A–24C are not to scale (with respect to either amplitude or time) and do not represent a quantitative comparison between the subject invention and the prior art.

FIG. 24A represents the steam pressure and steam load for an installation comprised of ideal steam generators and ideal controllers which are capable of maintaining a constant steam pressure despite radical (but nevertheless typical) changes in steam loads. Curve 122 represents the steam load over time. Inasmuch as the steam generators and controllers are ideal, curve 122 also represents the steam generator outputs. Curve 120 of FIG. 24A shows an ideal constant steam pressure over time as represented by curve 120.

As can be seen from curve 122, the steam load prior to time $t_o$ is relatively low. At time $t_o$ the steam load increases drastically and remains relatively high until time $t_1$, at which time the load decreases. Such a service change in load could be caused, for example, by the sudden opening and closing of a steam valve for heating of a tank or the like. At time $t_2$, the load increases a second time and remains at an elevated state until time $t_3$. At $t_3$, the load returns to its relatively low level. Despite the severe load changes, curve 120 indicates that the ideal generators maintained a constant steam pressure.

FIG. 24B represents a typical response of a two generator (forced-flow type) installation controlled by a prior art control apparatus. The steam load, which is represented by curve 22, is the same load as that of FIG. 24B. Prior to time $t_o$, the load is relatively light, therefore the prior art control apparatus will cause only one of the generators to be on line with the remaining generator being shut off.

At time $t_o$, the sudden increase in steam load 122 will cause a resultant drop in steam pressure as shown by the drop in curve 124. The drop in pressure is detected by the prior art control apparatus which causes the shut-off generator to be brought on line. However, as previously noted, there is an approximate 5 minute delay in bringing forced-flow type generator from a shut-off state to near maximum firing rate. (For a conventional drum type boiler, the delay may be as great as 1 hour or more.) During the time delay in bringing the second generator on line, the steam pressure will continue to drop significantly below the desired nominal value. Eventually, the output of the two generators will equal and then overshoot the steam load.

At time $t_1$, curve 122 of FIG. 24B indicates that the steam load drops to a relatively low value until time $t_2$. The resultant increase in steam pressure as indicated by curve 124 is detected by the prior art control apparatus which commands one of the generators to be shut off. The steam output will then eventually will drop down to the steam load level. At time $t_2$ the steam load again increases substantially. The resultant drop in steam pressure is detected by the control apparatus which will then command the generator which was just taken off line to come back on line again. During the delay period when the second generator is coming on line, the steam pressure will continue to drop below the desired nominal level. The output of the two generators eventually will equal and then overshoot the steam load. Finally, at time $t_3$, the steam load returns to a relatively low level. The resultant increase in steam pressure is detected by the control apparatus which will command one of the generators to be taken off line.

FIG. 24C shows the steam pressure and steam output curves 128 and 130, respectively, for an installation comprised of two forced-flow type generators which are controlled by the subject invention. It is assumed that the steam load variations with time, as represented by curve 122, are predictable based upon the operational history of the installation. It is also assumed that the system memory has been suitably programmed with Program Tables 109 (FIG. 7A) comprised of appropriate Load Indexes based upon the predicted steam load.

The memory will also be programmed with an appropriate Load Table such as the Load Table III of FIG. 6A which is typical for installations comprised of two generators.

The steam load curve 122 of FIG. 24C indicates that the steam load prior to time $t_o$ is relatively light. Thus, the Load Indexes programmed for this period will be low with a Load Index of 2 being typical. As can be seen from the Load Table of FIG. 6A, a Load Index of 2 indicates that the two generators will be commanded to a status of 2 and 0, respectively. Thus, one generator will be commanded to a maximum firing rate of 60% and the second generator will be shut off. As indicated by curve 118 of FIG. 23, a generator released to 60% firing rate will modulate between 60% and 20% of maximum firing rate depending upon the measured steam pressure.

Curve 122 of FIG. 24C indicates that the steam load will increase at time $t_o$ and remain at a relatively high level until time $t_1$. Thus, the Load Indexes read out of the memory will be relatively high during this time period with a Load Index of 6 being typical. As indicated by the Load Table of FIG. 6A, a Load Index of 6 will cause one generator to be released to 100% of maximum firing rate and the other generator to be commanded to 80% of maximum.

In order to improve the performance of the system, it is important that the generators be commanded to their new statuses prior to an anticipated change in load. Thus, the Program Table should be programmed such that the Load Indexes read out of the memory change from 2 to 6 prior to time $t_o$. This lead time permits the shut off generator to be brought on line prior to the anticipated load inincrease. The amount of lead time depends generally upon the response of the generators used in the installation. As previously noted, a typical forced-flow type generator takes approximately 5 minutes to be brought up from a shut off state to a maximum firing rate. Most of this time (typically approximately 4.5 minutes) is required to bring the generator from the shut off state to a minimum firing rate. Once the generator is at a minimum firing rate, it typically takes only approximately 0.5 minutes to bring a forced-flow type generator up to the maximum firing rate. Accordingly, if the Load Index change from 2 to 6 occurred at least 4.5 minutes prior to time $t_o$, performance would be optimized.

When the Load Index changes to 6 occurs at some time prior to time $t_o$, the two generators will be released to a 100% and 80% of maximum firing rate, respectively. Inasmuch as the steam load is still relatively light at this time, the actual firing rate of the two generators will be much less than the maximum released firing rate. In addition, the overall efficiency of the system during this short time period will be low since each of the generators will be fired at a low rate. The generator which was shut off will, however, have sufficient time to reach at least a minimum firing right before the steam load actually increases. When the steam load does increase, the resultant decrease in steam pressure will be detected by the internal modulating apparatus of each of the generators and the actual firing rate will rapidly increase to the level required to meet the increased load. (As previously noted, the change in firing rate should take no longer than approximately 0.5 minutes). Since the increase in steam demand is rapidly met, the drop in steam pressure is significantly less than that which occurs when prior art controllers are used.

At time $t_1$, curve 122 indicates that the steam load drops back to a relatively low level. The Program Table should, therefore, be programmed to produce Load Indexes of 2 after time $t_1$ so as to optimize the efficiency of the system at the new load level.

At time $t_2$, curve 122 indicates that the steam load suddenly increases a second time. Assuming that the appropriate Load Index for the new steam load is 5, the Program Table would be programmed to change the Load Indexes from 2 to 5 prior to the anticipated increase in load. Finally, at time $t_3$, the steam load returns to a relatively low level. Thus, the Program Table would be programmed to change the Load Indexes from 5 to 2 after time $t_3$.

Thus, the subject control apparatus not only optimizes the efficiency of a system for any particular load level, but also ensures that the steam pressure is maintained relatively constant in the presence of anticipated severe steam load changes. In addition, the subject control apparatus can, in certain circumstances, minimize the effect of unanticipated changes in steam loads. For example, if a drop in steam load is only momentary, it would be preferable to leave both generators on line. However, the prior art control apparatus would sense the increase in steam pressure and would, if the load level was sufficiently low, cause one of the steam generators to be momentarily shut off. The subject control apparatus avoids this problem since the state of the generators is not totally dependent on steam pressure. A generator will remain on time during short duration drops in steam load because the generator status is not changed by momentary load changes. For example, if the generators are released 60% and 80% of maximum firing rate as set by the programmed Load Indexes, a short duration drop in steam load will cause the actual firing rate of the generators to be reduced, but the drop will not cause either of the generators to be taken off line.

In order to avoid potential damage to the steam generators, each generator is provided with protective hardware so that the generators can be commanded directly to and from only certain states. FIG. 19 is a generator state diagram which shows all 16 possible states of a typical steam generator. FIG. 20 is a Generator State Table which sets forth further information regarding each of the states including the status of various generator switches including a generator start switch, generator start light, burner start switch and the burner command switch a, b and c. A "0" indicates that the switch is actuated and a "/" indicates that the switch status is indeterminate.

State 0, which is represented by circle 310, (FIG. 19), represents the manual state. When the generator is in the manual state, the status of the generator switches is indeterminate and operation of the generator is controlled independent of the microcomputer 61. As can be seen from the state diagram of FIG. 19, once the generator has been manually switched out of the manual state, the generator can be commanded out of the manual by the microcomputer 16, but only to state 1, as represented by circle 312, state 4, as represented by circle 314 or to state 6, as represented by circle 316. Although not shown in the state diagram, the generator may be switched to either the manual state 0 or an alarm state represented by circle 321 from any of the remaining 15 states.

If the generator is commanded to the shut off state or state 1, the generator start and the burner start switches will be actuated and the generator start light will be off ("unactuated"), as indicated in the Generator State Table. In addition, the burner command switches will be in the actuated position. When a state 1, the generator may be commanded only to state 2, as represented by circle 318, or to the alarm state. State 2 provides a 10 second start up delay. As indicated in the State Table of FIG. 20, when the generator in state 2, the generator start light will blink on and off so as to warn personnel in the area that the generator is being turned on.

At the completion of the 10 second wait period, the generator is commanded from state 2 to state 3 as represented by block 320. As shown in the State Table, the generator start switch is actuated which causes a main motor which drives the fuel and water pumps together with the combustion air blower to be turned on. The water bypass valve 85 is completely open in state 3 so that water will not be pumped through the heating coil. In addition, the generator start light will remain on in state 3.

The generator will remain in state 3 for 20 seconds and then switch to state 4 which is represented by circle 314. At state 4, the generator stop switch is deactivated and bypass valve 85 will be closed. Accordingly, water will begin to be pumped through the heating coil 75 so as to substantially fill the coil 75 with water and stabilize the pumping rate through the coil. Pumping will continue for 30 seconds as indicated by the State Table.

At the end of the 30 second pumping period, the generator will be commanded to state 5 for 1 minute. At the end of the 1 minute period, the temperature of the heavy oil (if heavy oil is used) will be checked in order to ensure that it has reached to proper temperature. The generator will then be commanded to state 6 at which time the burner start switch will be activated thereby starting the burner. The generator will remain in state 6 for 3 minutes.

At the end of the 3 minute period (which may be varied by reprogramming), the generator may be commanded to the next firing rate. The generator will stay at that rate during the same waiting period as long as there should be a staging up command. There is no delay involved by staging down command. If there is a staging down before the timings in the higher states are ended, the time difference for that stage will be used as waiting period by the next staging up. If all timings are ended the burner may be directly commanded to any of the four firing rates.

State 7, represented by circle 322, indicates the burner 11 is at a maximum 20% firing rate wherein each of the three burner switches is actuated. State 8, represented by circle 324, indicates the maximum permissible burner firing rate is 60% with only burner switches a and b being actuated. State 9 represented by circle 326 indicates that the maximum burner firing rate is 80% with switch a being the only switch actuated. Finally, circle 328 represents state 10 wherein the burning is released to its maximum or 100% firing rate. At this firing rate, none of the burner switches are activated. As can be seen from the state diagram, the generator can be commanded directly from any one of the firing rate states to any other firing rate state.

As will be subsequently described, a soot blowing sequence will be commanded by the microcomputer 61 under certain circumstances. If soot blowing is to take place, the generator it first commanded from any one of states 7, 8, 9 or 10 to state 11 which is represented by circle 330. At state 11, the firing rate is reduced to 20% as indicated by the actuation of each of the burner switches a, b and c. State 11 is only a transitory state, therefore the sequence will immediately proceed from state 11 to any one of states 12, 13 or 14. If soot blowing is to take place, the sequence will proceed to state 12, as represented by circle 329, for three minutes of soot blowing. During soot blowing, the burner is released to 100% as indicated by the deactuation of each of the burner switches. This high firing rate will permit the generator steam output to increase so as to compensate for the increased steam load due to soot blowing.

If the generator is to be shut off, the generator is first commanded from any one of the 4 firing rate states to state 11. Although it is possible to command the generator directly from the higher firing rate states to state 11, it is preferable that the rate be first reduced to 20% (state 7) and then commanded to state 11. If one or more of the other generators is to remain on line, the generator to be shut off will be commanded from state 11 to a standby state 13 which is represented by circle 332.

At state 13, the generator burner start switch will be deactuated and water will be pumped through the heating coil for 10 minutes so as to substantially fill the coil with water thereby replacing the steam/water mixture so as to reduce coil corrosion caused by the presence of oxygen. However, if the programmed load, as represented by the Load Index read out of memory, is equal to 0, then all of the generators in the installation will be shut off. In that case, the generator under consideration will be commanded to state 14 which is identical to state 13 except that the water pumping operation is of 20 minutes duration rather than 10 minutes. Inasmuch as all of the generators in the installation are to be commanded off, it is likely that the generator will remain idle for some time, therefore the increased duration of pumping further ensures that the steam/water mixture is replaced by water so as to prevent air from entering the coil during the idle period.

Once the pumping operation of either state 13 or 14 has been completed, the generator is commanded to state 1 at which time the generator is shut off. In shut off state 1 the only significant energy loss is radiation losses with the burner and the motor which drives the fuel and water pumps and the air blower being turned off.

Figure 9:
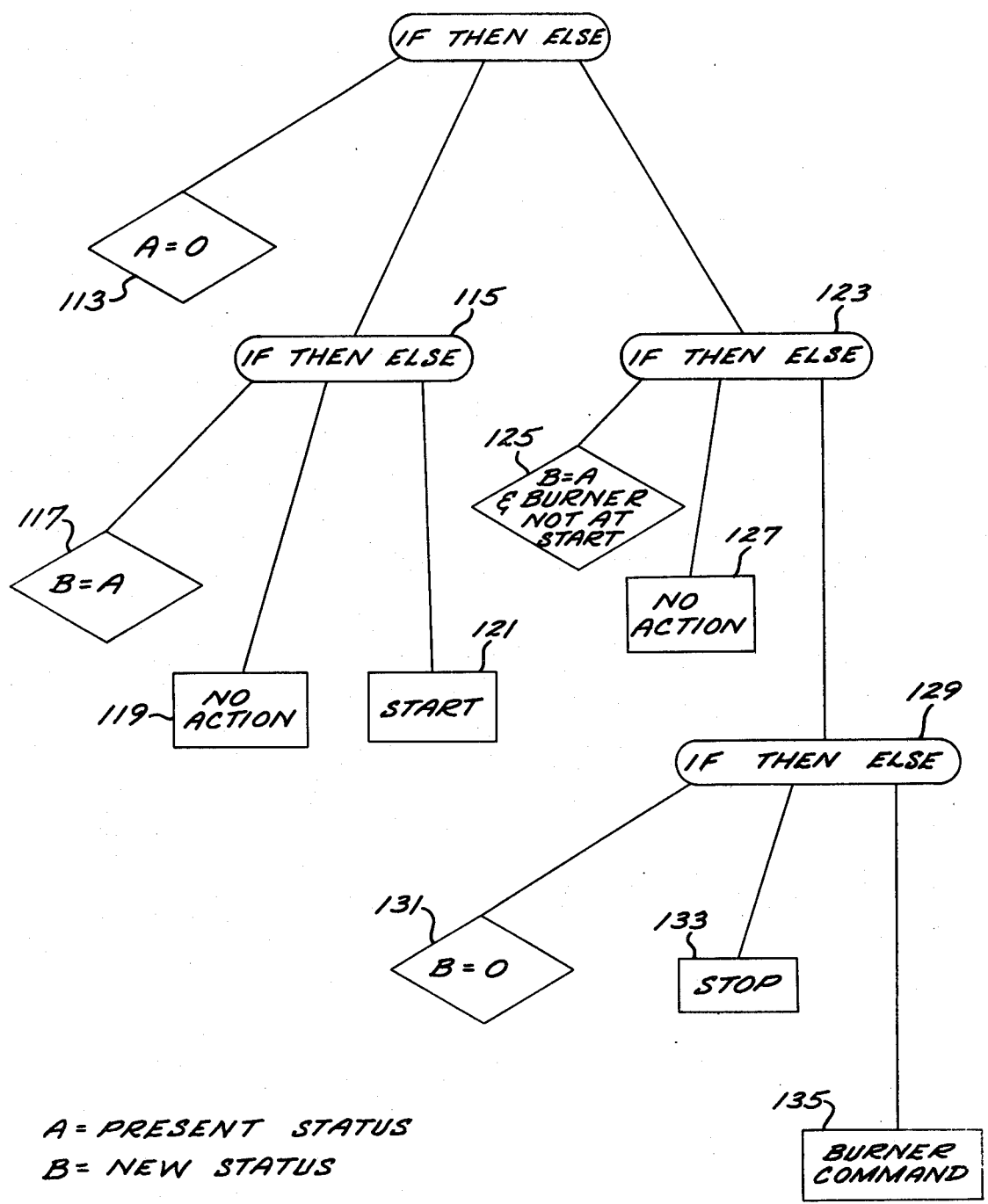
FIG. 9 shows a flow chart which illustrates the burner command sequence.

FIG. 9 shows the sequence which is used for commanding one of the generator burners as the computer cycles through the Program Tables 109. (As will be subsequently described, Load Indexes other than those provided by the Program Tables 109 may, under certain circumstances, be used for controlling the generators.) The letter "A" represents the present status of the generator with the letter "B" representing the new status which is read out of the Load Table 111 stored in the microcomputer memory once every 15 minutes. As indicated by block 113, if the present generator status A is equal to 0, the program proceeds to block 115 and then to block 117 and then to either block 119 or 121, depending upon the determination made at Block 117. As set forth in the generator status table of FIG. 5B, a status of 0 indicates that the generator is off line or shut off. Thus, the generator will be in state 0 as indicated in FIGS. 19 and 20. If the new status B is equal to the present status A (meaning B=0) as indicated by block 117, then the program will proceed to block 119 which indicates that no action is required. Accordingly, the generator in question will remain in the shut off state. On the other hand, if it is assumed that the present status A is not equal to the new status B (meaning B>0), then the program will proceed to block 121 which indicates that the generator burner start switch is to be activated. Thus, the generator will be commanded from the shut off state 1 to the burner start state 6 via intermediate states 2 through 5 (FIG. 19). As indicated by the Generator State Table of FIG. 20, when the generator is in state 6, the burner is kept at 20% for three minutes before proceeding to state 7, 8, 9, 10 or 11 depending on the new A and B values.

Assuming that 3 minutes later a new generator status B is read out of the memory which is equal to the present status A (which was status B during the previous 15 minute cycle), both A and B will be greater than 0. Accordingly, at block 113 it will be determined that A is not equal to 0, therefore the program will proceed to block 123 and then to block 125. At block 125, a determination is made as to whether the present generator status A is equal to the new status B and as to whether the burner is not in a start state. Although A and B are equal, the burner is in a start state. Accordingly, both conditions of block 125 are not met, therefore the program will proceed to block 129 and then to block 131. At block 131 a determination will be made as to whether the new status B is equal to 0. It has been assumed the B is greater than 0, therefore the program will proceed to block 135. As indicated by block 135, the burner will be commanded from the burner start state 6 (FIG. 19) to one of the four maximum permissible firing rate states 7 through 10 depending upon the actual value of the present generator status B. By way of example, if B is 3, the Generator Status Table of FIG. 15B indicates that the generator will be commanded to a maximum permissible firing rate of 80%, i.e., to state 9.

Assuming that the Load Index does not change, the next status B read out of the Load Table will also be 3. Accordingly, the program will proceed to block 123 and then to block 125. At block 125, it is determined that the present status A is equal to the new status B and that the burner is not in the start state. Accordingly, the program will proceed to block 127 which indicates that no action will be taken. Thus, the maximum firing rate will remain at 80%.

Assuming that the Load Index has decreased and that the next status B read out of the memory is 0, the program will proceed to block 123 and then to block 125. Inasmuch as the present status A is 3 and the new status B is 0, the program will proceed to block 129 and then to block 131. At block 131, a determination is made the new status B is 0. Accordingly, the program will proceed to block 133 which indicates that the burner is to be commanded to stop which will cause the generator state to pass from state 9, which is the 80% firing rate, to state 11 which is the burner stop state. Although the state diagram of FIG. 19 indicates that the generator can be directly commanded from state 9 to state 11, it is preferable that the generator be commanded to state 9 through intermediate states 8 and 7 so as to avoid an abrupt change in the system. As previously noted, State 11 is only a transitory state, therefore, the generator will be commanded to either state 13 or 14 for water pumping. At the end of the water pumping period, the generator will be commanded to state 1 or the shut off state.

In some circumstances, the measured steam load (or measured hot water load) will be greater than or less than the predicted, i.e., programmed load, as determined by the various Load Indexes in the selected Program Table. As will be subsequently described, appropriate steps will be taken should the measured load exceed the programmed load. In addition, action may be taken if the measured load falls below the programmed load. If the programmed load exceeds the measured load, the generators will be commanded to a capacity which exceeds the current load requirements. Accordingly, it is possible that more generators will be on line than required so as to reduce the efficiency of the installation. Furthermore, the generators which are on line will be commanded to maximum firing rates which may deviate from optimum rates, thereby further reducing the efficiency of the system. In order to increase the efficiency of the system, apparatus is included for correcting the programmed load in certain predetermined circumstances.

Figure 10:
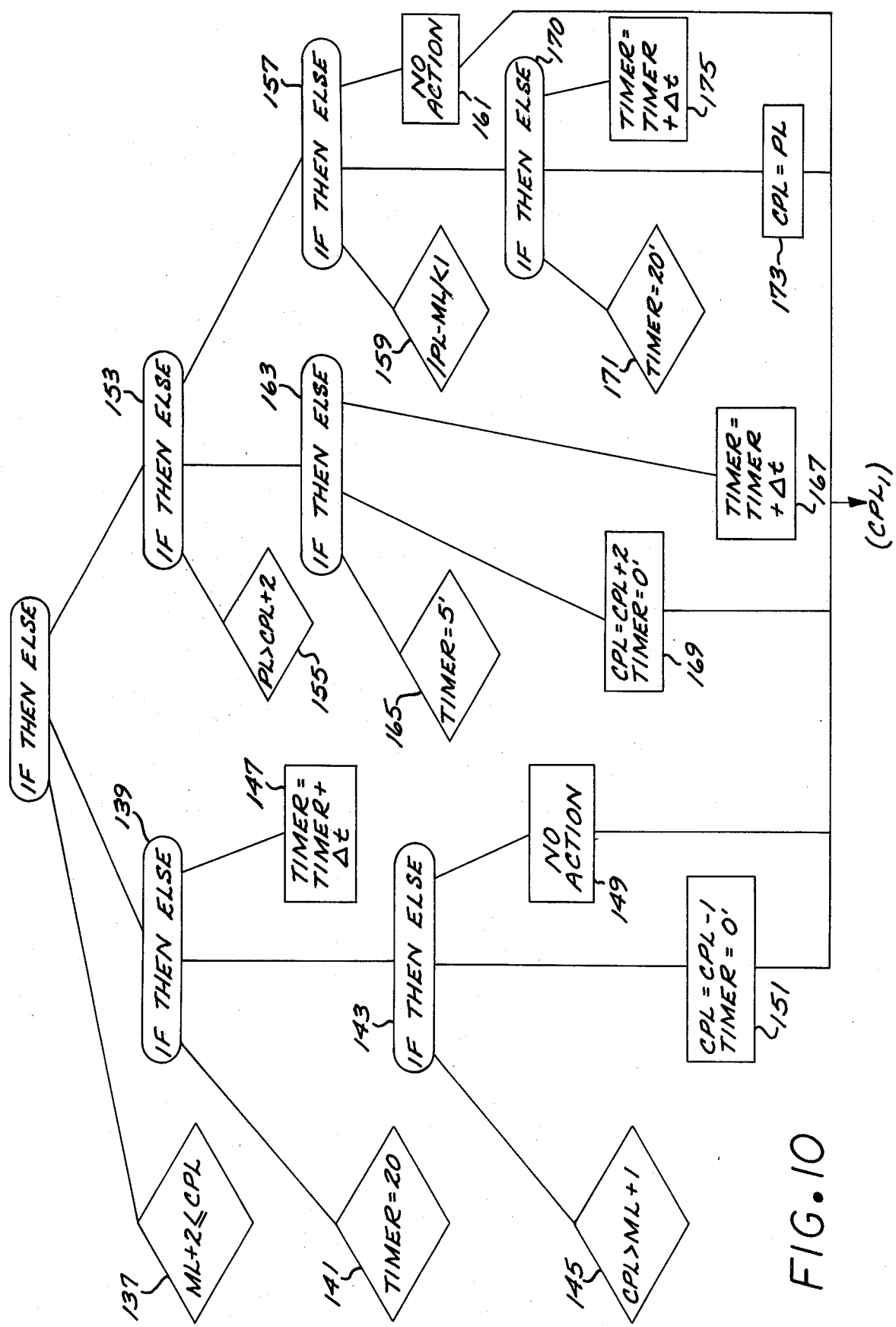
FIG. 10 shows a simplified flow chart which illustrates the manner in which a Programmed Load is corrected.
Figure 11:
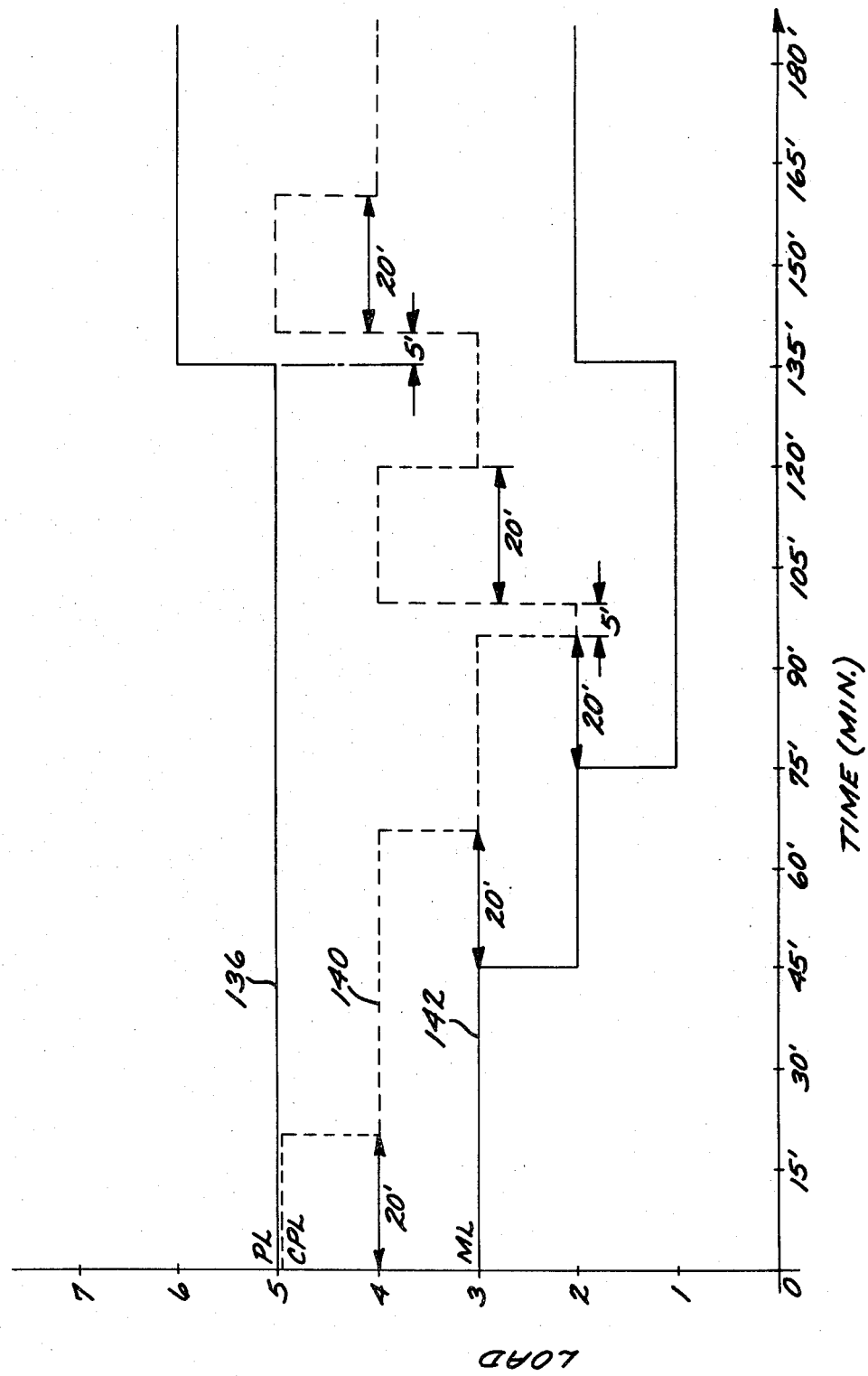
FIG. 11 shows a typical sequence wherein the Programmed Load is corrected.

FIG. 10 shows a simplified flow chart which illustrates the circumstances and manner in which the programmed load is corrected. Similarly, FIG. 11 shows a typical sequence which further illustrates the manner in which the programmed load is corrected. The three curves 136, 140 and 142 of FIG. 11 represent exemplary programmed loads PL, corrected programmed load CPL and measured loads ML, respectively. These value can all vary from 0 to 7. The programmed load PL is initially at 5 and the measured load is initially at 3. At the beginning of the sequence the corrected programmed load CPL is set equal to the programmed load PL and an internal microprocessor timer is set to 0 and will remain there until incremented.

Returning to the flow chart of FIG. 10, the measured load ML is compared with the corrected programmed load CPL (which is initially equal to the programmed load PL). At block 137, a determination is made as to whether the measured load ML plus 2 is smaller than or equal to the corrected programmed load CPL. The curves of FIG. 11 indicate that a real time of 0 minutes, the measured load ML plus 2 (5) is equal to the corrected programmed load (5). Accordingly, the program will proceed to block 139 and then to block 141.

At block 141 a determination is made as to whether the timer has incremented up to 20 minutes. The timer has not yet been incremented and is at 0 minutes, therefore the program will proceed to block 147. At block 27, the internal microprocessor timer will be permitted to increment. At a real time of 15 minutes, a new programmed load will be read out of memory. However, as indicated by the graph of FIG. 11, the new programmed load PL is identical to the original programmed load.

At a real time of 20 minutes, the timer will have incremented to 20 minutes. If during this time period the measured load ML plus 2 has continued to remain equal to or greater then the corrected programmed load CPL, the program will proceed to block 143 and then to block 145. The graph of FIG. 11 shows that the measured load ML did not in fact change, therefore the program will proceed to block 145 at which time a determination is made as to whether the corrected programmed load CPL is greater than the measured load ML plus 1. If CPL is not greater, the program will advance to block 149 which indicates that no action is to be taken. If the corrected programmed load CPL is greater than the measured load ML plus 1, thereby indicating that the commanded capacity of the installation exceeds that required by the current load, the program will proceed to block 151 which indicates that CPL is to be reduced by 1 and the timer is to be reset to 0 minutes. As can be seen in FIG. 11, the corrected programmed load CPL is initially 5 and the measured load ML is initially 3. Accordingly, at the end of the initial 20 minutes period CPL is reduced to 4. By way of example, if the installation has 3 generators, the Load Table of FIG. 6B indicates that the Load Index reduction from 5 to 4 will cause one of the generators to be taken off line thereby increasing the overall efficiency of the installation.

At the end of the first 20 minutes, the decrease in the corrected programmed load means that the measured load ML plus 2 is no longer less than or equal to the corrected programmed load CPL. Accordingly, block 137 indicates that the program will advance to block 153 and then to block 155. At block 155 a determination is made as to whether the programmed load PL is greater than the corrected programmed load CPL plus 2. Inasmuch as the PL is 5 at this time and CPL is 4, the program will advance to block 157 and then to block 159. At block 159, a determination is made as to whether the absolute value of the programmed load PL minus the measured load ML is less than 1. Inasmuch as FIG. 11 shows that PL−ML=1 during the relevant time period, the program will advance to block 161 which indicates that no action is to be taken and the microcomputer timer will remain reset.

Assuming for the moment that programmed load PL minus the measured load ML was less than 1, thereby indicating that the programmed load PL is equal to the measured load ML and indicating the load has been correctly predicted, the program would proceed to block 170 and then to block 171. At block 171, a determination would be made as to whether the timer is at 20 minutes. The timer is reset at this time, therefore the program will proceed to block 175 at which time the timer would be incremented for 20 minutes. If ML remained equal to PL during the 20 minute interval, the program will proceed to block 173 and the corrected programmed load CPL is set equal to the Programmed Load PL.

At approximately 45 minutes into the sequence, FIG. 11 shows that the Programmed Load PL has not changed and that the measured load ML has dropped from 3 to 2. Thus, a determination is made that ML plus 2 is less than or equal to CPL (block 137) so that the program is caused to advance to block 141. At block 141, a determination is again made as to whether the microcomputer timer is at 20 minutes. Inasmuch as the timer is reset to 0 at this time, the program will advance to block 147 at which time the timer is incremented. The timer continues to be incremented until the timer is at 20 minutes. At 20 minutes (approximately 65 minutes real time), the program will proceed to block 145 provided that the measured load ML plus 2 has continued to be equal to or less than the corrected programmed load CPL. At block 145 a determination is made as to whether the corrected program load CPL is greater than ML plus 1. Since FIG. 11 shows that CPL is greater than ML plus 1, the program will proceed to block 151 at which time CPL is reduced a second time by 1 (from 4 to 3) and the timer is again reset to 0. If the installation includes three generators, the table of FIG. 6B indicates that the maximum firing rate of one of the generators will be reduced from 100% to 80%.

At a real time of 75 minutes, FIG. 11 shows that the measured load ML drops again from 2 to 1. The last sequence previously described is repeated with CPL being reduced from 3 to 2 at the end of 20 minutes (real time of 95 minutes). At this time, ML plus 2 is greater than CPL, as determined at block 137, so that the program will proceed to block 153 and then to block 155. At block 155 it is determined that the programmed load PL is greater than CPL plus 2 so that the program will advance to block 163 and then to block 165. At block 165, a determination is made that the timer is at less than 5 minutes (the timer continues to be reset), therefore the program will advance to block 167 at which time the timer is incremented. The timer is incremented until it reaches 5 minutes at which time the program will advance to block 169. At block 169, CPL is increased by 2 at a real time of 100 minutes as shown in FIG. 11 and the timer is reset to 0. This action is taken because the corrected program load CPL has fallen substantially below the predicted or programmed load PL. This condition suggests that the load may suddenly increase, therefore the corrected program load CPL is increased in anticipation of possible and somewhat likely increase in load.

At a real time of 100 minutes, it is determined at block 137 that the measured load ML plus 2 is less than or equal to the corrected programmed load CPL. As shown in FIG. 11, this condition will persist for 20 minutes, therefore at a real time of 120 minutes, the corrected programmed load CPL will be again reduced by 1 (block 151) according to the previously described sequence.

At a real time of 135 minutes, the programmed load PL read out of the memory is increased from 5 to 6. In addition, the measured load ML increases from 1 to 2 at 135 minutes, this means that the change in load was predicted correctly by the microcomputer, but the magnitude of the measured load ML was not. Thus, at block 137, it is determined that the measured load ML plus 2 is not equal to or less than the corrected programmed load CPL. Accordingly, the program will proceed to block 153 and the block 155 at which time a determination is made that the programmed load PL exceeds the corrected programmed load CPL by more than 2. Inasmuch as this condition persists for more than 5 minutes, the corrected programmed load CPL is increased by 2 and the timer is reset as indicated by block 169.

When the corrected programmed load CPL is increased by 2 at a real time of 140, the measured load ML plus 2 become less than the corrected programmed load CPL as determined at block 137. Accordingly, the corrected programmed load will be reduced by 1 as indicated by block 151 at the end of a 20 minute wait period.

First and Second Steam Priority

As previously noted, action will also be taken should the steam pressure drop a predetermined amount below the nominal steam pressure. A drop in pressure indicates that the steam load has increased above the released capacity. If the average measured steam pressure is less than 80% of the nominal pressure for 5 or more minutes, the corrected programmed load CPL will be increased by 2. This action will either cause an additional generator to come on line or will increase the maximum permissible firing rates of one or more of the generators. By way of example, if the current corrected program load CPL for an installation utilizing 4 generators is 2, the Load Table of FIG. 6C indicates that generators nos. 1 and 2 will be on line and generators nos. 3 and 4 will be shut off. If the steam pressure should drop below 80% of the nominal pressure for 5 minutes, the corrected program load CPL will be increased from 2 to 4. As shown in the Load Table, this increase will cause generator no. 3 to be brought on line at a maximum firing rate of 60%.

If the average measured steam pressure continues to be less than 80% of the nominal pressure once the generators have stabilized at the new firing rates, the corrected program load CPL will be again increased by 2. This process will be repeated until the average measured steam pressure is at least 80% of the nominal pressure.

If the average measured steam pressure is less than 70% of the nominal pressure for 5 minutes, the first steam priority function, as represented by block 30 of FIGS. 1A and 1B, is actuated by the microcomputer 61. As previously noted, the first steam priority apparatus 56 (FIG. 4A) causes a noncritical portion of the steam load 57 to be disconnected from the generator. Should the average measured steam pressure fall to less than 60% of the nominal pressure for 5 minutes, the second steam priority function, as represented by block 50 of FIGS. 1A and 1B, will be actuated. When the second steam priority function is actuated, all remaining steam load, with the exception of highly critical loads, will be disconnected from the steam generator. Should the measured average steam pressure continue to remain at less than 60% of the nominal pressure for an additional 5 minutes, a general alarm will be given. As previously noted, the microcomputer controlled apparatus 56 of FIG. 4A is used for shedding the lower priority steam loads. Similar apparatus can be provided in hot water installation wherein predetermined low priority hot water loads can be disconnected in the event the water temperature drops below predetermined levels.

Figure 18:
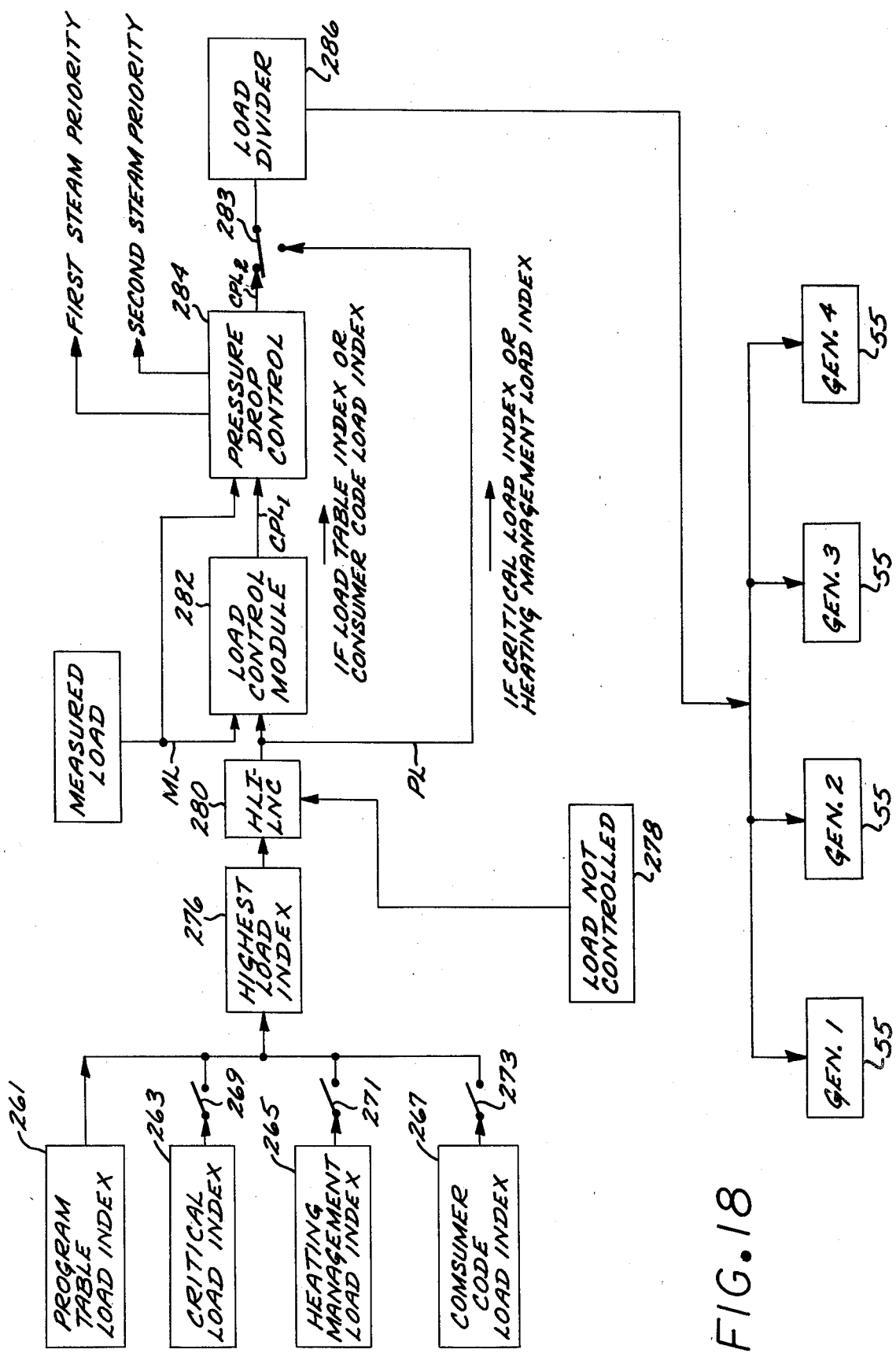
FIG. 18 is a simplified block diagram which further illustrates the operation of various features of the subject invention.

FIG. 18 shows a simplified block diagram which further illustrates the energy management, first and second steam priority and other related functions of the subject invention. The four blocks 55 represent the four steam generators which are included in the exemplary installation. As previously discussed, the status of each of the generators is determined by the Corrected Programmed Load CPL which is derived from the Load Indexes stored in the microcomputer memory. There are four different sources of Load Indexes, one of which has been described. The primary source is the previously described Program Tables 109 represented by Program Table Load Index block 261. The remaining three sources are represented by blocks 263, 265 and 267 which provide Load Indexes under special circumstances. As indicated by switches 269, 271 and 273, any one or more of the functions provided by the three blocks may be disabled by the user. Critical Load Index block 263 represents the source of Load Indexes which may be provided when a critical event at the generator installation occurs. By way of example, a drop in outdoor temperature to freezing or below may be considered a critical event. If this event should occur, it may be desirable to start up generators which would normally but shut off (according to the Program Tables 109) or to take some other form of action. Heating Management Load Index block 265 also provides Load Indexes under certain circumstances. The operation of this feature will be subsequently described. The Consumer Code Load Index block 267 provides Load Indexes when certain loads are connected to the steam source. A unique consumer code is associated with each load. When a load is placed on line, the corresponding code is produced. This code is received by the microcomputer 61 which causes a Load Index associated with the consumer code to be read out of the memory.

This Load Index indicates the magnitude of the steam load which was placed on line.

As represented by the Highest Load Index block 274, the highest load index HLI provided by blocks 261, 263, 265 and 267 is selected to ensure that the generator capacity will be adequate to meet the anticipated load requirements. In addition, in some installations it is possible that part of the steam load will be met by one or more generators which are not under microcomputer 61 control. In order to compensate for the additional uncontrolled steam source, microcomputer 61 has been programmed with a Load Index value LNC which represents that portion of the load not controlled by the microcomputer. An additional LNC value can be added via an analog input (level 4). As represented by block 280, the highest load index HLI is corrected by substracting the load index LNC so as to produce the programmed load PL. If the programmed load PL was provided by either the Program Table Load Index block 261 or the Consumer Code Load Index block 267, the programmed load PL may be modified as represented by the Load Control Module block 282. Block 282 performs the previously described function of correcting the programmed load PL in the event the measured load ML falls below the programmed value (See discussion regarding FIGS. 10 and 11).

The corrected programmed load $CPL_1$ output of the Load Control Module 282 is further processed as represented by the Pressure Drop Control block 284. As previously discussed, should the steam pressure suddenly drop a predetermined amount for 5 minutes, the corrected programmed load $CPL_1$ will be increased by 2. Should the steam pressure drop even further, the previously described first and second steam priority functions may be activated and the corrected programmed load $CPL_1$ increased once more. FIG. 18 also shows a Load Divider block 286 which performs the generator command sequence previously described in conjunction with FIG. 9. The Load Divider operates in response to either the corrected program load output $CPL_2$ of the Pressure Drop Control block 284 or the program load output PL of block 280. As represented schematically by switch 283, if the load index is provided by either the Program Table Load Index block 261 or the Consumer Code Load Index block 267, the Load Divider will act in response to the corrected programmed load $CPL_2$. If the load index is provided by the Critical Load Index or the Heat Management Load Index, the Load Control Module block 282 and the Pressure Drop Control Module 284 will be bypassed and the Load Divider block 286 will act in response to the programmed load indexes PL provided by block 280.

As previously described in conjunction with the Load Tables 111 of FIGS. 6A-6C, each of the generators is assigned a certain status depending upon the current load level so as to maximize the efficiency of the installation. By way of example, if the Corrected Program Load $CPL_2$ provided by block 284 is 4, the Load Table of FIG. 6C indicates that for a 4 generator installation, maximum efficiency will be achieved by commanding generator 1 to a maximum permissible firing rate of 100%, generator 2 to a maximum permissible firing rate of 60%, generator 3 to a maximum permissible firing rate of 60% and by commanding generator 4 to shutdown.

Soot Blowing

As previously noted, the installations of FIG. 4A and 4B include apparatus for soot blowing as represented by block 97. A heavy soot buildup on the heating coil 75 will interfer with the transfer of heat from the generator burner to the water carried in the coil. Accordingly, a soot buildup results in a higher than normal stack temperature for a given load. Soot blowing serves to blow away at least part of the soot build-up on the heating coil 75 by directing a stream of high pressure steam, provided by the steam separator 83, over the coil.

Figures 12, 14, 16:
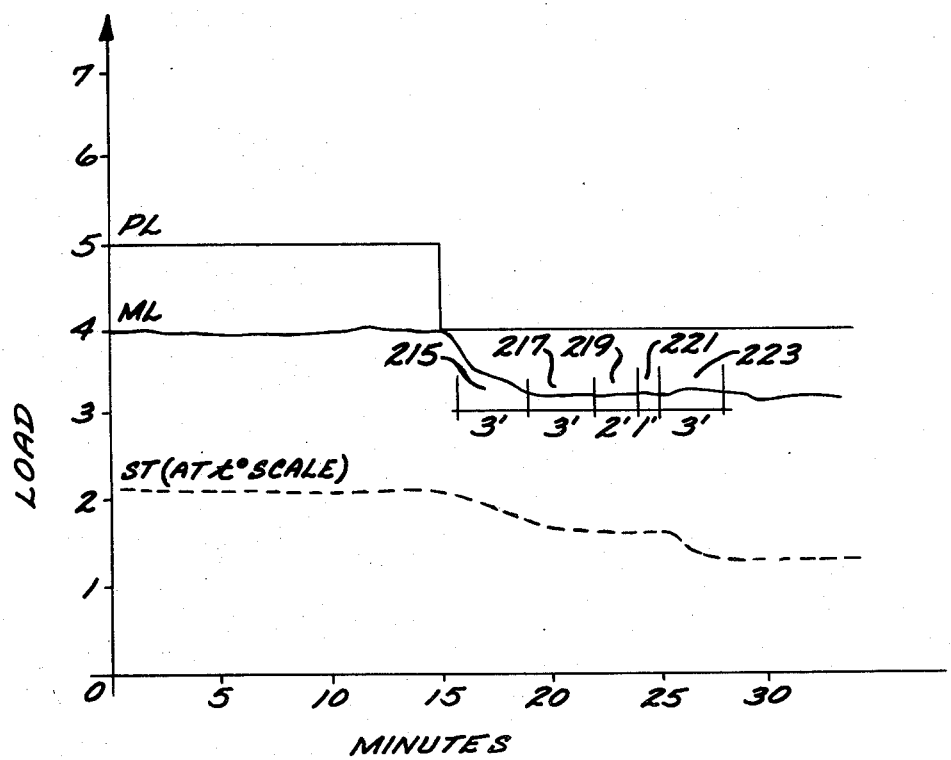
FIG. 12 is a table containing exemplary nominal stack temperatures for various load conditions.
FIG. 14 shows a typical soot blowing sequence.
FIG. 16 is a table which contains typical excess air and air trim values for various loads.

Generally, soot blowing should be performed for every 4 hours that a generator is on line. In addition, soot blowing should be performed when the stack temperature exceeds a predetermined value for a predetermined period of time. FIG. 12 shows an exemplary Nominal Stack Temperature Table which contains the nominal stack temperatures for various loads and various fuel types including oil (both heavy and light) and gas. These nominal values are stored in the microcomputer memory 65.

Figure 13:
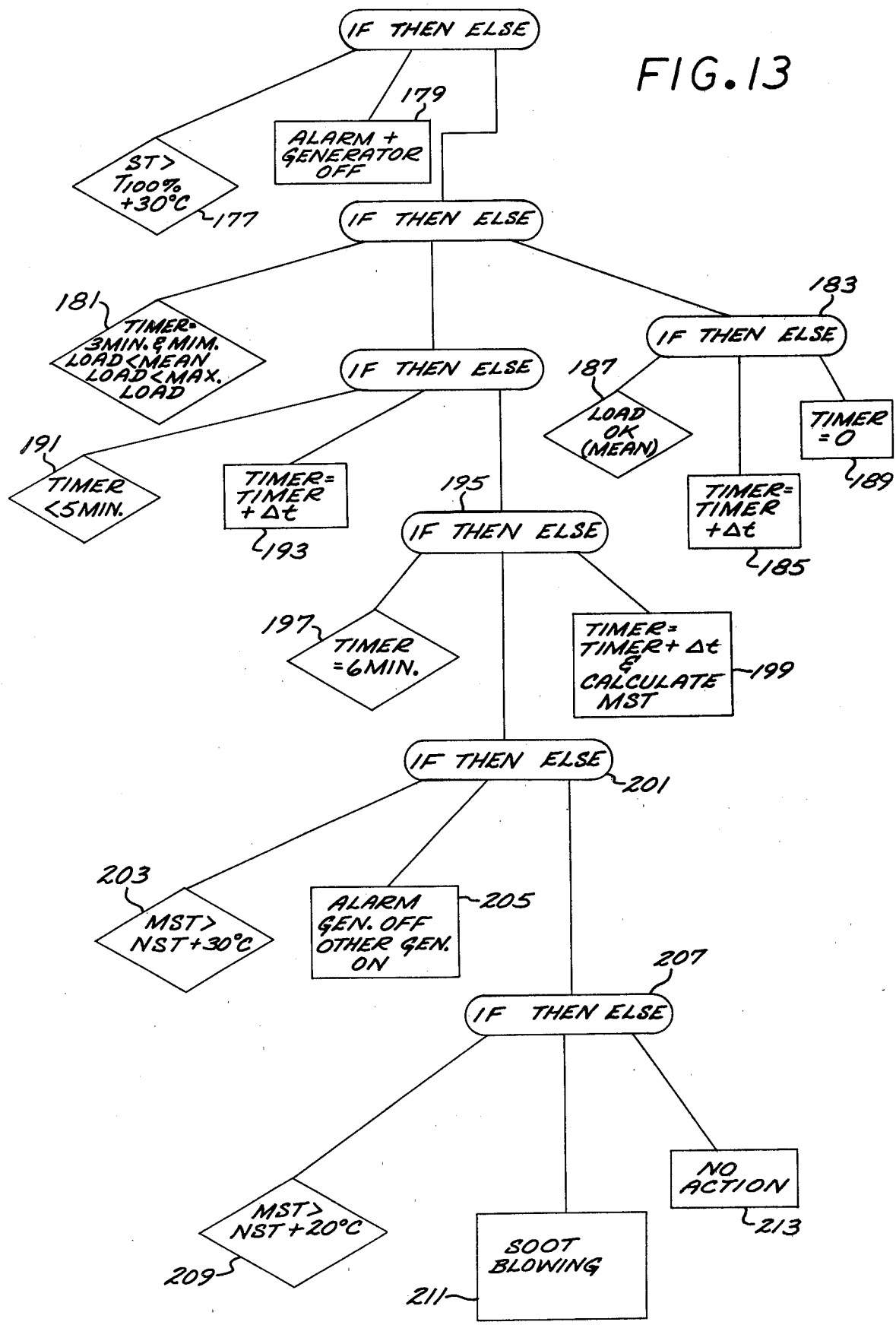
FIG. 13 shows a simplified flow chart which illustrates the operation of the soot blowing apparatus of the subject invention.

FIG. 13 is a simplified flow chart which illustrates the operation of the soot blowing apparatus. Soot blowing takes place generally whenever the stack temperature ST, as measured by the stack temperature monitor 99 (FIG. 4), exceeds a predetermined value for a minimum time period. An absolute upper stack temperature limit is set which is equal to the predetermined nominal stack temperature at 100% load plus 30° C. As indicated by block 177 of FIG. 13, should the stack temperature exceed this limit, the program will advance to block 179 at which time an alarm will be given and the generator will be shut down.

As previously noted, the stack temperature ST will vary as the steam load varies. In order to accurately measure the stack temperature, it is necessary to verify that the load has stabilized. Accordingly, the load will be measured once approximately every 10 seconds during a 3 minute time interval as measured by an internal microcomputer 61 timer. First the program will advance to block 181. At block 181, a determination is made first as to whether the internal timer has been incremented to 3 minutes and second as to whether the load had stabilized. The timer is reset to 0 minutes at this time. In addition, the determination as to whether the load has stabilized will not be made until the 3 minute period is over. Accordingly, the program will proceed to block 183 and then to block 187. At block 187, a determination is made as to whether the load was found to be stable. The stability of the load has not yet been measured, therefore the program will proceed to block 185 at which time the timer will be permitted to increment. During the three minute time interval, the minimum load measurement and the maximum load measurement made in the interval is stored in the microcomputer memory. Once the 3 minute period has expired, the mean measured load over the time period is calculated. In addition, a minimum load and maximum load equal to 90% and 110% of the mean load, respectively, are calculated. If the calculated mean load is greater than the calculated minimum load and less than the calculated maximum load (as determined at block 181), the load is considered to have stabilized. If the load has not stabilized, the program will proceed to block 187 and then to block 189 at which time the internal microcomputer timer is reset. Once the timer is reset, the load is measured during a second 3 minute interval in order to determine if the load has stabilized. Once the load is stabilized, the program will proceed to block 191.

Assuming that the load was in fact stable, there is a 2 minute wait period as indicated by blocks 191 and 193 following the termination of the 3 minute measurement period. The purpose of this wait period is to permit the stack temperature to stabilize once the load has stabilized. At the end of the 2 minute wait period, the internal microcomputer timer will have advanced from 3 minutes to 5 minutes. Next the program will advance to block 195 and then to block 197. At block 197, a determination is made as to whether the timer has advanced to 6 minutes. Inasmuch as the timer is at 5 minutes, the program will advance to block 199. As indicated by block 199 and 197, the timer will be permitted to increment from 5 minutes to 6 minutes. During this 1 minute interval the stack temperature will be repeatedly measured.

At the end of the 1 minute interval at 6 minutes, the mean stack temperature MST is calculated based upon the repeated measurements. Next, the program will advance from block 197 to block 201 and then to block 203. At block 203 a determination is made as to whether the measured mean stack temperature MST exceeds a maximum temperature equal to the nominal stack temperature NST for current load conditions (as indicated by the table of FIG. 12) plus 30° C. If the maximum temperature is exceeded, the program will advance to block 205 at which time an alarm will be given and the generator in question will be shut off. If another generator is available, it will be brought on line.

If the measured stack temperature MST does not exceed the nominal stack temperature NST plus 30° C., the program will proceed to block 207 and then to block 209. At block 209, a determination is made as to whether the measured stack temperature MST exceeds a second maximum temperature equal to nominal temperature NST plus 20° C. If the maximum temperature is exceeded, the burner will either be shut off or a 3 minute soot blowing operation will be caused to commence. Inasmuch as the soot blowing operation consumes a large amount of steam, the status (i.e., maximum firing rate) of the remaining generators may be temporarily increased during the operation to minimize the drop in steam pressure. If the stack temperature is not reduced to below the preset limit, a second 3 minute soot blowing operation (for the same load) will be caused to commence. If the temperature continues to exceed the preset limit, an alarm is given and the generator is shut off.

FIG. 14 illustrates a typical soot blowing sequence showing an exemplary programmed (or corrected) load curve PL, measured load curve ML and a stack temperature curve ST (which is not shown to scale). As can be seen from the timing diagram of FIG. 14, the programmed load PL and measured load ML appear to remain relatively constant until a real time of approximately 15 minutes. No soot blowing takes place during this 15 minute period inasmuch as the measured stack temperature does not exceed the preset limit for the present load. At 15 minutes, the programmed load PL and the measured load ML drop, thereby causing the stack temperature ST to also be reduced. A determination is made (FIG. 13, block 181) that the load has not stabilized during the first 3 minute period 215 following the drop in load, therefore the internal timer is reset and no action is taken. During the second 3 minute time period 217, a determination is made that the load has stabilized. Accordingly, a 2 minute delay period 219 (FIG. 13, block 191) is provided which permits the stack temperature ST to stabilize. During the 1 minute time period 221 following period 219, the stack temperature is repeatedly measured and the mean temperature is calculated (FIG. 13, block 199). Assuming that the measured mean stack temperature MST now exceeds the preset maximum temperature for the given load conditions, a 3 minute soot blowing sequence during time period 223 takes place. The soot blowing operation causes the stack temperature ST to be reduced to below the preset limit, therefore additional soot blowing is not required. If, after 2 soot blowing sequences (at the same load), the mean stack temperature had continued to exceed the preset limit, the generator would be taken off the line.

Load Heating Management

As previously noted in the discussion regarding FIG. 18, it may sometime be necessary, or at least desirable, to replace the Load Indexes provided by the Program Tables 109 of FIG. 7A with other Load Indexes. By way of example, should a critical event occur in the installation such as a drop in temperature below freezing, the Critical Load Index box 263 of FIG. 18 indicates that a new Load Index can be provided which will increase the generator capacity above that prescribed by the Program Table.

If the generator installation is used for heating purposes, it may be preferable to alter the generator start up times depending upon the outdoor temperature. For example, on a very cold day the generators could be started earlier than had been programmed in the Program Tables 109 to ensure that the facility is at the desired room temperature before a work shift begins. Similarly, if certain chemicals must be heated to a predetermined temperature to carry out a process, it may be necessary to advance the generator start up time so that the chemicals will be at the proper temperature when the process is scheduled to begin. The Load Heating Management function, represented by the Heating Management Load Index block 265, serves to vary the generator start up time in response to the difference in temperature $\Delta T$ between a reference temperature selected by the user and the outside temperature. The greater the temperature difference $\Delta T$, the earlier the generators will be started up.

FIG. 21 is a graph which illustrates the operation of the Load Heating Management function in an exemplary installation. Curve 288 represents the nominal steam (or hot water) temperature versus time heating curve. Nominal curve 288 indicates that the generators are normally turned on at time $t_o$ in accordance with the Load Indexes stored in Program Tables 109. However, at 6 hours prior to the nominal turn on time $t_o$ ($t_o$-6), the outside temperature is measured and compared with the user selected reference temperature. If the difference in temperature $\Delta T$ is greater than 20° C., appropriate Load Indexes will be produced so that the generators will be turned on 1 hour earlier than originally programmed as represented by curve 296. No action will be taken if $\Delta T$ is less than 20° C. at $t_o$-6 hours.

At $t_o$-5 hours, the outside temperature is measured a second time. If the outside temperature has increased so that $\Delta T$ is less than 15° C., the generators will be started up at the normal time $t_o$ with any Load Indexes produced as a result of the earlier $t_o$-6 hour measurement being ignored. If the outdoor temperature at $t_o$-5 hours has increased so that $\Delta T$ is greater than 15° C. but less than 20° C., appropriate Load Indexes will be produced which will cause the generators to be brought on line at $t_o$-45 minutes as represented by curve 294. If the temperature difference $\Delta T$ is still greater than 20° C., appropriate Local Indexes will be produced to start the generators at $t_o$-1 hours.

At $t_o$-4 hours, the outdoor temperature is measured a third time. If $\Delta T$ is less than 10° C., the normal generator start time $t_o$ will be used. If $\Delta T$ is greater than 10° C. but less than 15° C., the generators will be started at $t_o$-30 minutes as represented by curve 292. If $\Delta T$ is greater than 15° C. but less than 20° C., the generators will be started at $t_o$-45 minutes. If $\Delta T$ is greater than 20° C. the generators will be started at $t_o$-1 hour.

At $t_o$-3 hours, the outdoor temperature is measured a fourth time. If $\Delta T$ is less than 5° C., then the normal start time $t_o$ will be used. If $\Delta T$ is greater than 5° C. but less than 10° C., the generators will be started at $t_o$-15 minutes as represented by curve 290. If $\Delta T$ is greater than 10° C. but less than 15° C., then the start time will be at $t_o$-30 minutes. If $\Delta T$ is greater than 15° C. but less than 20° C., the start time will be advanced to $t_o$-45 minutes. Finally, if $\Delta T$ is greater than 20° C., the start time will be advanced to $t_o$-1 hour.

Thus, the start time at which the fixed value Load Indexes are produced by the Heating Management Load block 265 will be varied in accordance with the temperature differential $\Delta T$. In certain applications it may be desirable to also vary the magnitude of the Heating Management Load Indexes in accordance with the temperature differential as well as the start time. The magnitude of the Load Indexes would then be varied according to the following equation:

$$VLI = K \times (\Delta T/T_R) \times FLI \quad (1)$$

where

VLI = the Variable Heating Management Load Index;

K = a multiplication factor;

$T_R$ = the user selected reference temperature;

$\Delta T$ = the difference between the actual temperature and $T_R$; and

FLI = the Fixed Heating Management Load Index.

Equation (1) shows that when the temperature differential $\Delta T$ is 0, the Variable Heating Management Load Index VLI is also 0. Accordingly, the start up time of the generators will not be affected. Should the temperature differential $\Delta T$ be greater than 0, Variable Heating Management Load Indexes VLI will be produced having a magnitude proportional to the temperature differential. Thus, both the start up time and the firing rate will vary in accordance with $\Delta T$.

It should be noted that the Heating Management feature can be applicable to steam or hot water controlled processes other than heating. By way of example, if the humidity of a facility is controlled by a steam operated dehumidifier, the outside humidity rather than outside temperature would be measured. If the outside humidity exceeded some user selected reference by more than a preset amount, then the steam generator start up time could be advanced in the previously described manner so that the humidity of the facility would be at the desired level at the desired time.

Combustion Feedback

As previously noted, the subject invention may further include combustion feedback apparatus for controlling the amount of excess air of combustion. Theoretically, the correct fuel/air ratio implies that all oxygen is consumed in the combustion process. However, due to many factors including fuel particle size, fuel composition, generator load and nozzle conditions, a certain amount of excess air (oxygen) is required to ensure complete combustion. If there is not adequate excess air, fuel will be wasted due to incomplete combustion. On the other hand, if there is a high level of excess air, a substantial energy loss will result due to the heating of the excess air and its subsequent release into the atmosphere.

The microcomputer controlled air trim apparatus 103 of FIG. 4A permits the air/fuel ratio of the burner to be precisely adjusted. To ensure safe operation, the air trim apparatus is designed to effectuate only small changes in the air/fuel ratio, with the ratio being primarily controlled by the generator's internal modulating apparatus. In most installations, the air trim apparatus is implemented to vary the excess air from 0 to 60%. A trim value TV is assigned to each of the possible excess air settings. By way of example, if an 8 bit analog-to-digital converter (256 levels) is to be used, the trim value TV assigned to the minimum excess air of 0% is 51 and the trim value TV assigned to the maximum excess air of 60% is 256. There are, therefore, 205 (256−51) possible intermediate trim values. A Trim Value Table, such as the table at FIG. 16, is stored in the microcomputer memory. The trim values TV in the table depend upon many factors including the generator load and the type of fuel fired by the generator. As shown in the table, the nominal excess air for an oil fired generator at a firing rate of 20% is 40%. This corresponds to a trim value of 192. At a 100% firing rate, the excess air decreases to 20% which corresponds to a trim value of 115.

Figure 15:
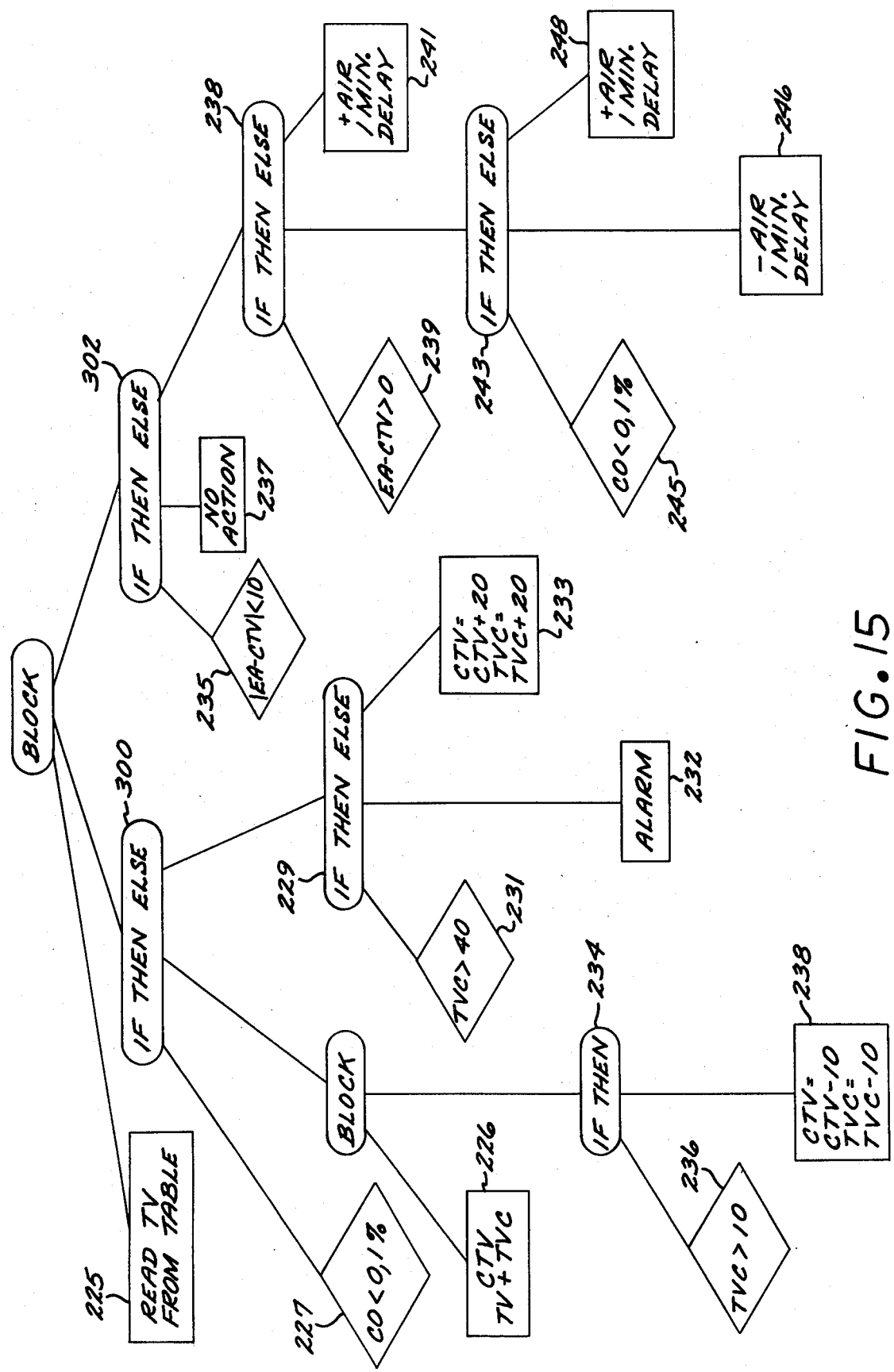
FIG. 15 shows a simplified flow chart which illustrates the operation of the combustion feedback feature of the subject invention.

FIG. 15 shows a simplified flow chart which illustrates the operation of the combustion feedback feature of the subject invention. The chart includes two interrelated branches including a first branch which begins at block 300 (and includes block 225) and a second branch which begins with block 302. The general function of the first branch is to calculate a suitable corrected trim value CTV to be used for adjusting the excess air EA of the installation. The general function of the second branch is to adjust the combustion air in accordance with the corrected trim value CTV established by the first branch.

The first branch of the FIG. 15 flow chart will be described first. As indicated in block 225, the nominal Trim Value TV for the generator under consideration is read from the Trim Value Table of FIG. 16 depending upon the current generator firing rate. In addition, a Trim Value Correction TVC is set equal to 0 at this time. The program will then proceed to block 227 which indicates that the concentration of carbon monoxide (CO) present in the exhaust gases is to be measured using the Gas and Soot Monitor 101 (FIG. 4A). Inasmuch as the final combustion process of all fossil fuels is the oxidation of CO to carbon dioxide ($CO_2$), one indication of incomplete combustion is the presence of CO in the exhaust gases as measured by the Gas and Soot Monitor 101 (FIG. 4A). Generally, if the concentration of CO is greater than 0.1%, additional combustion air is needed. The amount of soot in the exhaust gases is another indication of incomplete combustion. If the soot factor S, as measured by the Gas and Soot Monitor 101, is greater than 2, the air of combustion should normally be increased.

At block 227, a determination is made as to whether the concentration of CO is less than 0.1% and the soot factor is less than 2. If the concentration is less than 0.1% and the soot factor is less than 2, the program will proceed to block 226 at which time a corrected Trim Value CTV is set equal to the sum of the Trim Value TV read from the memory and the Trim Value Correction TVC which is 0 at this time. Thus, the Corrected Trim Value CTV is set equal to the nominal Trim Value TV.

Once the Corrected Trim Value CTV has been established, the value is used in the second branch of the flow chart. At block 235, the Excess Air EA is calculated in the conventional manner based upon the measured concentration of $CO_2$ using the Gas and Soot Monitor 101. In the alternative, the Excess Air EA can be calculated based upon the measured concentration of $O_2$. If the absolute value of the difference between the Excess Air EA and the Corrected Trim Value CTV is less than 10, as determined at block 235, the Excess Air EA is deemed proper. Accordingly, the program will proceed to block 237 which indicates that no action should be taken with respect to the amount of combustion air.

Assuming that the absolute value of the difference between the Excess Air and the Corrected Trim Value CTV is greater than 10, the program will proceed to block 238 and then to block 239. At block 239 a determination is made as to whether the Excess Air EA is greater or less than the Corrected Trim Value CTV. Assuming that the Excess Air EA is the smaller quantity, the program will proceed to block 241. At block 241, the air trim apparatus 103 (FIG. 4A) will be commanded by the microcomputer 61 to increase the amount of combustion air a predetermined amount. After a 1 minute delay to permit the combustion process to stabilize, the program will return to block 227 at which time the concentration of CO will be measured a second time. The CO concentration should continue to be less than 0.1% inasmuch as the measured concentration was less than 0.1% even before the air of combustion was increased. Accordingly, the program will advance to block 226 at which time the Corrected Trim Value will be calculated a second time. Since the Trim Value TV and the Trim Value Correction have not changed, the Corrected Trim Value CTV will remain the same.

The program will then proceed to block 235 at which time the Excess Air EA will be measured and compared with the Corrected Trim Value CTV a second time. The excess Air should have increased because of previous air adjustment. Assuming that the absolute value of the difference between the Excess Air EA and the Corrected Trim Value CTV is less than 10, the program will proceed to block 237 which indicates that no further action with regard to the combustion air will be taken. The program will then return to block 234 and then to block 236 at which time a determination will be made as to whether the Trim Value Correction TVC is greater than 10. In the present example, the Trim Value Correction remained 0, therefore no further action will take place. If TVC had exceeded 10, the program would proceed to block 238 at which time both the Corrected Trim Value CTV and the Trim Value Correction TVC would be reduced by 10. The purpose of the reduction is to reinitialize CTV and TVC for use in any subsequent air adjustment sequence.

Assuming that the previously described increase in combustion air which occured at block 241 was not sufficient to reduce the absolute value of the difference between the Excess Air EA and the Corrected Trim Value CTV to less than 10, the program will proceed to block 241. At block 241 the combustion air will be increased a second time as previously described. This process will be repeated until the absolute value indicated at block 235 is less than 10.

Assuming that originally measured Excess Air EA had exceeded the Corrected Trim Value CTV by 10 or more, the program would have proceeded to block 243 rather than block 241. The program would then advance to block 245 at which time the concentration of CO would be measured a second time. This is a backup measurement inasmuch as it has been determined at block 239 that the Excess Air EA measurement was too high. In addition, it had been previously determined at block 227 that the concentration of CO is less than 0.1% and no subsequent changes had been made with respect to the combustion air. Accordingly, the program will advance to block 246 at which time the microcomputer will command the air trim apparatus to reduce the combustion air a predetermined amount. After a 1 minute delay to permit the combustion process to stabilize, the program will return to block 235 in the manner previously described. At block 235 a determination is made as to whether the decrease in combustion air was sufficient to reduce the absolute value of the difference between the Excess Air EA and the Corrected Trim Value CTV to less than 10. If the value is less than 10, no further action will be taken with respect to the combustion air. If the absolute value is still too high, the combustion air will be further reduced until the difference is 10 or less.

Next, if it is assumed that the originally measured concentration of CO had been greater than 0.1% rather than less, the program would have proceeded to block 229 and then to block 231. At block 231, a determination will be made as to whether the Trim Value Correction TVC is equal to or greater than 40. Inasmuch as TVC is 0 at this time, the program will proceed to block 233. As indicated by block 233, the Corrected Trim Value CTV and the Trim Value Correction TVC will both be increased by 20. Thus, the Corrected Trim Value CTV will be equal to the Trim Value read out of the Trim Value Table of FIG. 16 plus 20 and the Trim Value Correction will be 20.

The program will then proceed to block 235 at which time the absolute value of the difference between measured Excess Air EA and the Corrected Trim Value CTV will be determined. Inasmuch as the CO concentration is greater than 0.1%, it is very likely that the increased Corrected Trim Value CTV will exceed the measured Excess Air EA by more than 10. Accordingly, the program will proceed to block 238 and then to block 239 at which time it will be determined that the Corrected Trim Value CTV is greater than Excess Air EA. Accordingly, the program will proceed to block 241 at which time the microcomputer 61 will command the air trim apparatus to increase the combustion air by a predetermined amount. After a 1 minute delay, the concentration of CO will be measured at block 227.

Assuming that the increase in combustion air was not adequate to reduce the concentration of CO to 0.1% or less, the program will return to block 229 and then to block 231. At block 231, a determination will be made as to whether the Trim Value Correction TVC is 40 or more. The Trim Value Correction TVC is now 20, therefore the program will proceed to block 233 at which time the Corrected Trim Value CTV and the Trim Value Correction will both be increased a second time by 20.

The program will then proceed to block 235 at which time the Excess Air will again be measured and compared with the new Corrected Trim Value. The Corrected Trim Value will no doubt exceed the Excess Air EA by more than 10, therefore the program will return to block 241 and the combustion air will be increased a second time.

Following a 1 minute delay, the program will return to block 227 and the CO concentration will again be measured. If the CO concentration is below 0.1%, the program will proceed to block 226 at which time the Corrected Trim Value CTV will be recomputed. So long as there is no change in load, the Trim Value TV will remain unchanged and the Trim Value Correction will still be at 40. Thus, the recomputation of the Corrected Trim Value CTV will not change the value. Accordingly, the program will proceed to block 235 and the Excess Air EA will be measured again. Assuming that the absolute value of the difference between the Excess Air EA and the Corrected Trim Value is now less than 10, the program will proceed to block 237 which indicates that no action will be taken with respect to the combustion air.

If the previously described second increase in combustion air was not sufficient to reduce the concentration of CO to below 0.1% as determined at block 227, the program will proceed to block 229 and then to block 231. At block 231 a determination is made that the Trim Value Correction is 40. This means that a relatively large change in combustion air from the nominal value was not sufficient to reduce the concentration of CO to a satisfactory level. Accordingly, the program will proceed to block 232 at which time an alarm will be given.

The above described process is periodically repeated to ensure that the Excess Air EA is proper for all firing conditions. Should the load change, a new Trim Value is read from the Trim Value Table. The concentration of CO is then measured after a second delay to permit the new load to stabilize. In the event that repeated combustion air adjustments during a 5 minute period are not sufficient to reduce the CO concentration to 0.1% or below, the generator burner will be turned off and the combustion air will be increased until the CO concentration is less than 0.1%. Once the CO concentration is satisfactory, the burner is commanded back on. Similarly, is the concentration of CO should exceed 0.2% for 1 minute or more, all air adjustments will be terminated and the generator in question will be taken off line and replaced with another generator if one is available.

Efficiency Calculation

The fifth embodiment of the subject invention may also include as represented by block 35 of FIGS. 1A and 1B apparatus for calculating the efficiency of the installation. The so-called "indirect method" of calculation is used wherein the efficiency is determined by substraction the percentage heat loss from 100%. The percentage heat loss is determined in the well known conventional manner using the measured stack temperature ST (as determined by the Stack Temperature Monitor 99), the measured concentration of $CO_2$ or $O_2$ in the exhaust gases (using Gas and Soot Monitor 99) and the radiation losses of the generator.

Water Bypass

Block 39 of FIGS. 1A and 1B represent the water bypass feature of the subject invention. As previously noted, the water bypassing apparatus includes bypass valve 85 (FIG. 4). Bypass Valve 85 is primarily controlled by the internal generator modulating apparatus in response to the measured steam load. However, the bypass apparatus permits the amount of water bypass to be precisely trimed.

In order to ensure that dissolved solids are removed from the generator heating coil, a certain amount of excess water should exit the coil. This excess water is separated from the steam by separator 83 and conducted to the hotwell 77 by way of steam trap 84. The actual amount of excess water depends upon operating conditions including the type of condensate system, steam pressure, feedwater temperature, the bypass pump condition and firing rate. The steam trap 84 will periodically open and close in order to discharge the excess water. The ratio of the time during which the trap is open to the time in which the trap is closed should be relatively constant for a given installation operating under fixed conditions. The actual steam trap open time is communicated to the computer from the steam trap via the I/O Interface.

FIG. 22 shows an Open Steam Trap Time Table which sets forth the number of minutes (accumulative) per hour (or seconds per minute) that the steam trap is open under various operating conditions for an semi-closed type condensate system, a deaererator type condensate system and a open type condensate system. By way of example, for a semi-closed type feedwater system operating at a steam pressure of 14.0 bar, a feedwater temperature of 153° C. and a steam trap pressure of 8.5 bar, the steam trap will be open for approximately 2.5 minutes per hour (or seconds per minute) at a firing rate of 20%. The time will increase to a maximum nominal value of 12.6 minutes per hour at a 100% firing rate.

At high firing rates, a large fraction of the water is passed through the heating coil 75 with only a small fraction being bypassed through valve 85 which is nearly closed. Due to the manner in which most bypass valves, are constructed, it is preferable that the water bypass valve not be trimmed when the valve is almost closed. Accordingly, the bypass function will not be performed unless the firing rate is less than approximately 50%. In addition, it is preferable that bypass triming not take place unless the generator system has stabilized. Accordingly, the bypass function will not be performed unless the current load has not changed more than 10% for at least 5 minutes and unless the generator burner has been on for at least 10 minutes.

The water bypass function is performed by first measuring the total amount of time that the steam trap is open over a 5 minute period. The ratio of the actual open time to the 5 minute time period is then computed. This unitless ratio is represented by the term $T_A$. Next, the nominal ratio $T_N$ of then open steam trap time to a 5 minutes period is calculated using the Open Steam Trap Time Table of FIG. 22 according to the following equation:

$$T_N = t_T \times \sqrt{\frac{P_{NS} - P_T}{P_{AS} - P_T}} \times K \quad (2)$$

where $T_N$ = nominal ratio in minutes per 5 minutes;
$t_T$ = open steam trap time in minutes per hour from table;
$P_{NS}$ = nominal steam pressure;
$P_{AS}$ = actual steam pressure;
$P_T$ = trap pressure;
$K$ = 1/12 hours/minute (1 hour/60 minutes × 5 minutes/minute)

By way of example, if the actual measured steam pressure $P_{AS}$ is 13.5 bar, the firing rate is 40% and a semi-closed feedwater system is used, then the following values will be used according to the table of FIG. 22:

$t_T$ = 4.9 minutes/hour
$P_{NS}$ = 14 bar
$P_T$ = 8.5 bar

Substituting the above values in equation (1):

$$T_N = 4.9 \times \sqrt{\frac{14 - 8.5}{13.5 - 8.5}} \times \frac{1}{12}$$

$$T_N = 0.43$$

Once the nominal steam trap open to close time ratio $T_N$ is calculated, a comparison is made between the nominal ratio $T_N$ and actual measured ratio $T_A$. If the measured ratio $T_A$ exceeds the nominal ratio $T_N$ by at least 0.2, the bypass valve will be commanded to open a predetermined amount thereby reducing the excess water. If the measured ratio $T_A$ exceeds the nominal ratio $T_N$ by 0.4 or more, the bypass value will be automatically adjusted until the difference between the ratios is less than 0.2. In addition, an alarm will be given.

If the nominal ratio $T_N$ exceeds the measured ratio $T_A$ by 0.2, the bypass value will be commanded to close a predetermined amount thereby increasing the excess water. Similarly, if the ratio $T_N$ exceeds $T_A$ by 0.4 or more, the bypass value will be adjusted until the difference between the ratios is less than 0.2. In addition, an alarm will be given.

The water bypass feature of the subject invention would not normally be used in hot water generators.

Chemical Treatment

As previously noted, the subject invention includes apparatus represented by block 45 of FIGS. 1A and 1B for monitoring the chemical makeup of the feedwater and the condensate from the steam load and for treatming the feedwater if necessary. Chemical monitoring is accomplished by chemical monitor 93 of FIG. 4 which includes various conventional chemical measuring devices which produce electrical signals proportional to the pH of the feedwater together with signals which are proportional to the total dissolved solids TDS, sulfite concentration and hardness of the feedwater. In addition, chemical monitor 60 is provided which produces signals which are proportional to the pH and the TDS of the condensate produced by condenser 58 from the steam returned from the steam load. The chemical treatment apparatus 95 is comprised of a plurality of fixed rate pumps which dispense various chemicals, which will be subsequently described, into the hotwell 77 in accordance with signals provided by the I/O Interface.

Figure 17A:
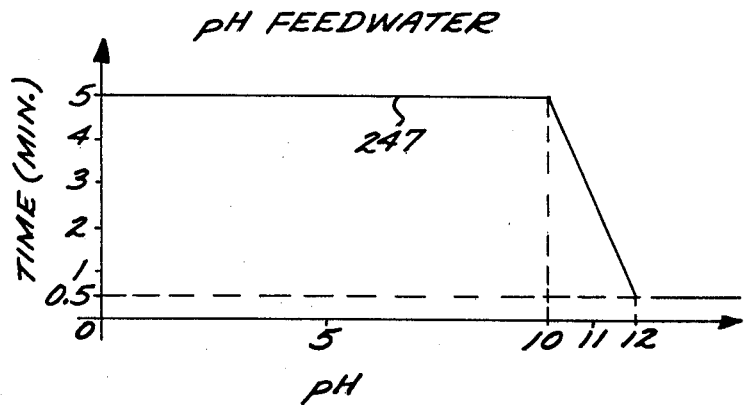
FIG. 17A is an exemplary graphy which illustrates the manner in which the pH of the generator feedwater is controlled by the subject invention.

FIG. 17A shows an exemplary curve 247 which illustrates the manner in which the pH of the feedwater is controlled. The pH of the feedwater is adjusted by dispensing predetermined amounts of soda into the hotwell. Curve 247 shows the total time that the fixed-rate chemical pump is activated per 5 minute period. If the pH of the feedwater, as measured by monitor 93, is greater than 12, the chemical pump is activated only 0.5 minutes out of a 5 minute period. In other words, almost no action is taken. If the pH of the feedwater drops below 10, an alarm is given and soda is dispensed continuously (5 minutes out of the 5 minute period) until the pH is greater than 10. If the pH is equal to or less than 12 and is greater than or equal to 10, the microcomputer will command the chemical treatment apparatus to dispense soda into the hotwell for a time period $t_1$ per 5.0 minutes according to the following equation:

$$t_1 = 5.0 - m_1 \times (pH - 10) \text{ minutes} \quad (3)$$

where $m_1$ = slope of curve 247 between a pH of 10 and 12 or 2.25 min.; and
pH = measured feedwater pH.

Figure 17B:
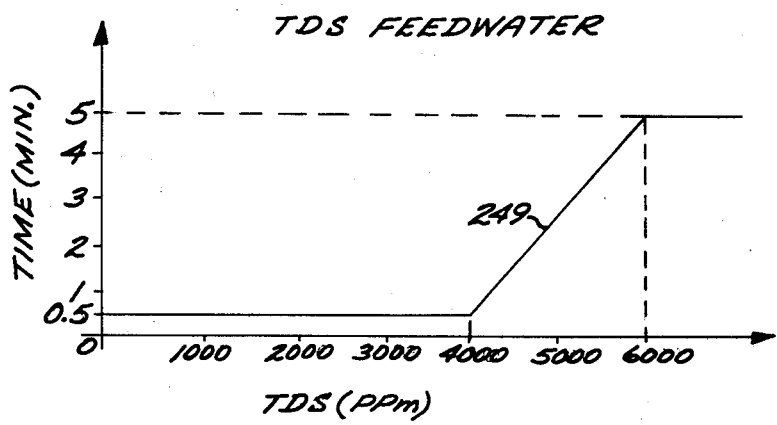
FIG. 17B is an exemplary graph which illustrates the manner in which the total dissolved solids of the generator feedwater are controlled by the subject invention.

FIG. 17B is an exemplary curve 249 which illustrates the manner in which the concentration of total dissolved solids TDS in the feedwater is controlled. As indicated by curve 249, if the TDS in the feedwater (as measured by monitor 93), is less than 4,000 ppm, the blowdown valve 91 is activated for what is equivalent to only once every 0.5 minutes per 5 minute period. If the TDS exceeds 6000 ppm, curve 249 indicates that the blowdown valve will be activated continuously, that is, for 5 minutes every 5 minute period. In addition, an alarm will be given. If the measured TDS is greater than approximately 4000 and less than approximately 6000, microcomputer 61 will cause the blowdown valve 91 to be opened for the equivalent of a time period $t_2$ per 5 minutes according to the following equation:

$$t_2 = 0.5 + M_2 \times (TDS - 4000) \text{ minutes} \quad (4)$$

where $m_2$ = slope of curve 249 between a TDS of 4000 ppm and 6000 ppm or 0.00225 minutes per ppm; and
TDS = measured total feedwater dissolved solids in ppm.

Figure 17C:
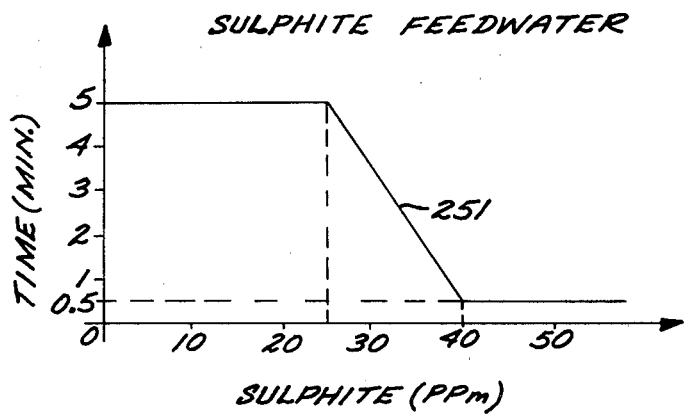
FIG. 17C is an exemplary graph which illustrates the manner in which the sulphite concentration of the generator feedwater is controlled by the subject invention.

FIG. 17C shows an exemplary curve 251 which illustrates the manner in which the concentration of sodium sulphite (an oxygen scavenger) in the feedwater is controlled. If the sulfite concentration is greater than 40 ppm, as measured by monitor 93, a chemical pump in the chemical treatment apparatus 95 is caused to dispense sodium sulphite into the hotwell 77 for only approximately 0.5 minutes per 5.0 minute period. If the measured sulfite concentration is less than 25 ppm, an alarm is given and sulfite is continuously dispensed (5 minute per 5 minute period) at a predetermined rate until the sulfite concentration reaches 25. Finally, if the concentration of sulfite is greater than 25 ppm, but less than 40 ppm, sodium sulfite is pumped for a time period $t_3$ per 5.0 minutes according to the following equation:

$$t_3 = 5.0 - m_3 \times (SO_3 - 25) \text{ minutes} \quad (5)$$

where $m_3$ = slope of curve 251 between a sulfite concentration of 25 ppm and 40 ppm or 0.3 minutes per ppm; and $SO_3$ = measured feedwater sulfite concentration in ppm.

Figure 17D:
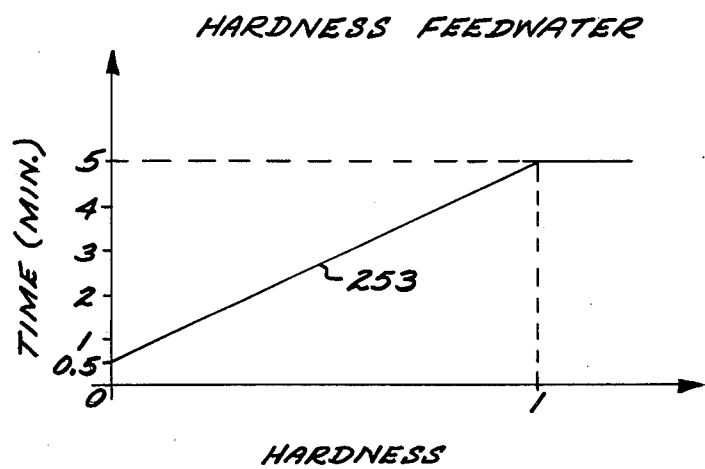
FIG. 17D is an exemplary graph which illustrates the manner in which the hardness of the feedwater is controlled by the subject invention.

The hardness of the feedwater is controlled in the manner illustrated by curve 253 of FIG. 17D. If the hardness, as measured by monitor 93, is greater than 1.0, phosphate is continuously added (5 minutes per 5 minute period) by a fixed-rate pump included in the chemical treatment apparatus 95 of FIG. 4. In addition, an alarm is given if the hardness exceeds 1.0 for 15 minutes or more. If the measured hardness is less than 1.0, phosphate is pumped into the hotwell for a time period $t_4$ per 5.0 minutes according to the following equation:

$$t_4 = 0.5 + m_4 \times H \text{ minutes} \tag{6}$$

where $m_4$ = slope of curve 253 at a hardness less than 1.0 or 4.5 and

H = measured hardness of the feedwater.

Figure 17E:
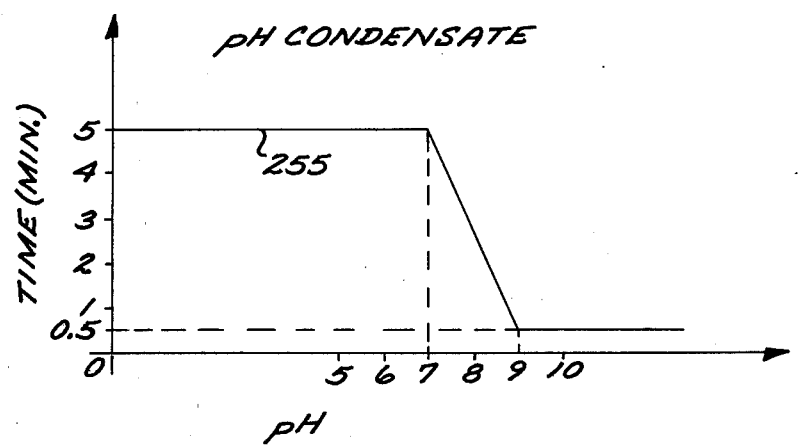
FIG. 17E is an exemplary graph which illustrates the manner in which the pH of the generator condensate is controlled by the subject invention.

The pH of the condensate exiting condenser 58 may be different than that of the water in the hotwell 77. For example, the piping associated with the steam load frequently will increase the acidity of the condensate. Accordingly, the pH of the condensate is monitored by a separate chemical monitor 60 which also measured the TDS of the condensate. Curve 255 of FIG. 17E illustrates the manner in which the pH of the feedwater is controlled in response to the measured pH of the condensate. If the measured pH of the condensate is greater than 9, a conventional amine compound is added at a relatively low rate of 0.5 minutes per 5 minute period by the chemical treatment apparatus 95. If the pH is less than 7, amine is continuously added (5.0 minutes per 5.0 minute period) and an alarm is given. If the measured pH is greater than 7, but less than 9, amine is added to the hotwell at a time period $t_5$ per 5.0 minutes according to the following equation:

$$t_5 = 5.0 - m_5 \times (pH - 7) \text{ minutes} \tag{7}$$

where $m_5$ = slope of curve 255 between a pH of 7 and 9 or 2.25 minutes; and pH = measured pH of condensate System Monitor Block 47 of FIGS. 1A and 1B represents the System Monitor feature of the subject invention. This feature permits an operator to quickly and easily determine the state or condition of each of the generators and the installation by way of the display terminal 67 (FIG. 2). With respect to the condition of the steam generators, the following states or conditions will be displayed, either continuously or at the option of the operator:
1. Operation hours;
2. Measured steam load;
3. Programmed load;
4. Corrected programmed load;
5. Alarm;
6. Stack temperature;
7. Excess water;
8. Excess air;
9. Carbon monoxide;
10. Soot factor;
11. Fuel type;
12. Steam pressure;
13. Steam temperature; and
14. Soot blowing.

With respect to the steam generator installation, the following states or conditions will be displayed, either continuously or at the option of the operator:
1. Chemical Treatment;
2. Critical value (block 263, FIG. 18);
3. Hotwell temperature;
4. Ambient temperature;
5. Heavy oil temperature;
6. Receiver pressure (deaerator or semi-closed systems);
7. Steam pressure;
8. Steam quantity;
9. Feedwater quantity;
10. Water hardness;
11. Oxygen in feedwater;
12. pH feedwater;
13. TDS feedwater;
14. pH condensate;
15. TDS condensate;
16. Steam temperature;
17. First steam priority;
18. Second steam priority;
19. Blowdown; and
20. Feedwater temperature.

Consumption Calculation

As represented by block 49 of FIGS. 1A and 1B, the subject invention for the includes apparatus from carrying out the previously noted Consumption Calculation feature. This feature permits the cost of producing each unit of steam (or hot water) to be calculated and displayed. Accordingly, for any predetermined time period, the quantity of water consumed (as described by water measurement apparatus 78) will be determined as will the quantity of fuel consumed (as determined by fuel measurement apparatus 86) and the quantity of electrical energy consumed. The quantity of steam produced in the elevant time period will also be measured. Finally, the cost of the water, fuel and electrical energy consumed in the relevant time period will be used to determine the cost per unit of steam produced during the period.

Thus, various embodiments of a novel control apparatus for multiple steam generator or a multiple hot water generator installation have been disclosed. Although such embodiments have been described in some detail, such detail is intended to be illustrative and not in a limiting sense.

What is claimed is:

1. A control apparatus for controlling the generators of a multiple steam generator or a multiple hot water generator installation, said control apparatus comprising:

modulating control means for controlling the firing rate of each of said generators in response to the actual measured steam or hot water load of the installation;

load data means for providing predicted load data which corresponds to predicted steam or hot water loads for said installation; and burner command means for limiting the firing rate of each of said generators to one of at least two different maximum firing rate levels in response to said predicted load data, whereby the actual firing rate of each of said generators may be controlled so as to optimize efficiency of the installation.

2. The control apparatus of claim 1 wherein one of said at least two different maximum firing rate levels is a shut off level wherein the generator is shut off.

3. The control apparatus of claim 2 further comprising a first predicted load data correction means for adjusting said predicted load data in the event said predicted loads are less than said actual measured loads.

4. The control apparatus of claim 3 further comprising a second predicted load data correction means for adjusting said predetermined load data in the event said predicted loads are greater than said actual measured loads.

5. The control apparatus of claim 4 wherein said load data means provides said predicted load data for each of a plurality of time intervals during a control sequence time period.

6. The control apparatus of claim 5 wherein said predicted load data includes generator status data for each of said generators, with said data controlling said maximum firing rate level of each of said generators.

7. The control apparatus of claim 6 wherein said control sequence time period includes an aperiodic time period and a periodic time period, with said predicted load data being produced only once for each of said time intervals during said aperiodic time period and at least once for each of said time intervals during said periodic time period.

8. The control apparatus of claim 6 wherein the installation is provided with a stack, with said apparatus further comprising:
    temperature measurement means for providing actual temperature data which corresponds to the actual stack temperature of each of said generators;
    nominal stack temperature means for providing nominal stack temperature data for each of said generators which corresponds to the nominal stack temperature for different firing rates of each of said generators;
    soot blowing control means for comparing said actual temperature data and said nominal stack temperature data and for providing a soot blowing control signal in the event said actual stack temperature exceeds said nominal stack temperature, and
    sood blowing means for removing soot from a heating coil of said generators in response to said soot blowing control signal.

9. The control apparatus of claim 8 wherein said soot blowing control means provides said soot blowing control signal periodically, and when said actual stack temperature exceeds said nominal stack temperature by a predetermined quantity for a predetermined time period.

10. The control apparatus of claim 6 further comprising:
    excess air means for providing actual excess air data which corresponds to the actual excess air of combustion of each of said generators;
    nominal excess air means for providing nominal excess air data for each of said generators which corresponds to the nominal excess air for different firing rates of each of said generators;
    excess air control means for comparing said actual excess air data and said nominal excess air data and for providing an air trim command signal in response thereto, and
    air trim means responsive to said air trim command signal for adjusting the air/fuel combustion ratio of each of said generators.

11. The control apparatus of claim 10 wherein said control apparatus further comprises:
    gas measurement means for providing gas measurement data which corresponds to the concentration of carbon monoxide in the combustion air of each of said generators; and
    wherein said excess air control means compares said gas measurement data, said nominal excess air data and said excess air data and provides said air trim command signal in response thereto.

12. The control apparatus of claim 6 further comprising priority means for removing certain predetermined loads in the event the total load exceeds the capacity of said generators.

13. The control apparatus of claim 6 further comprising a third predicted load data correction means for adjusting said predicted load data should a predetermined critical event occur.

14. The control apparatus of claim 13 wherein said predetermined critical event is a drop in outdoor temperature below a predetermined level.

15. The control apparatus of claim 6 further including a fourth predicted load data correction means for adjusting said predicted load data in the event certain predetermined loads are added or removed.

16. The control apparatus of claim 6 wherein said installation is a multiple steam generator installation and wherein said control apparatus further comprises:
    actual excess water measurement means for providing actual excess water measurement data which corresponds to the actual excess water produced by each of said generators;
    nominal excess water means for providing nominal excess water data which corresponds to the nominal excess water for different firing rates of each of said generators;
    excess water control means for comparing said actual excess water measurement data with said nominal excess water data and providing an excess water command signal in response thereto, and
    excess water adjust means responsive to said excess water command signal for adjusting the quantity of excess water of each of said generators.

17. The control apparatus of claim 16, wherein said actual excess water measurement is responsive to a steam trap signal provided by a steam trap at each of said generators.

18. The control apparatus of claim 17 wherein the installation is provided with a fixed rate water pump and wherein said excess water adjustment means includes a water bypass valve on each of said generators which bypasses the pump.

19. The control apparatus of claim 6 wherein said installation is a multiple-steam generator installation and wherein said control apparatus further comprises:
    pH measurement means for providing an actual pH data signal which corresponds to an actual generator feedwater pH;
    nominal pH means for producing a nominal pH data signal which corresponds to a nominal generator feedwater pH;
    pH control means for comparing said actual generator feedwater pH data signal with said nominal pH data signal and for providing a pH control signal in response thereto; and pH adjust means for adding chemicals to said feedwater which change said feedwater pH in response to said pH control signal.

20. The control apparatus of claim 6 wherein said installation is a multiple-steam generator installation and wherein said control apparatus further comprises:
   total dissolved solids means for producing an actual total dissolved solids data signal which corresponds to the actual total dissolved solids of the generator feedwater;
   maximum total dissolved solids means for producing a maximum total dissolved solids data signal which corresponds to the maximum desired total dissolved solids in the generator feedwater;
   total dissolved solids control means for comparing said actual total dissolved solids signal with said maximum desired total dissolved solids signal and for producing a total dissolved solids control signal in response thereto, and
   total dissolved solids adjustment means for adjusting the total dissolved solids in the feedwater in response to said total dissolved solids control signal.

21. The control apparatus of claim 20 wherein said total dissolved solids adjustment means comprises a blowdown valve which causes the feedwater to be removed from a heating coil of said generators.

22. The control apparatus of claim 6 wherein said installation is a multiple-steam generator installation and wherein said control apparatus further comprises:
   sulfite concentration means for producing an actual sulfite concentration data signal which corresponds to the actual sulfite concentration of the generator feedwater;
   maximum sulfite concentration means for producing a maximum sulfite concentration data signal which corresponds to the maximum desirable sulfite concentration of the generator feedwater;
   sulfite concentration control means for comparing said actual sulfite concentration data signal and said maximum sulfite concentration data signal and for producing a sulfite control signal in response thereto, and
   sulfite concentration adjust means for adding a chemical to the generator feedwater in response to said sulfite control signal for the purpose of adjusting the sulfite concentration of said feedwater.

23. The control apparatus of claim 6 wherein said installation is a multiple-steam generator installation and wherein said control apparatus further comprises:
   water hardness measurement means for providing an actual water hardness signal which corresponds to the actual hardness of the generator feedwater;
   maximum water hardness means for producing a maximum water hardness data signal which corresponds to the maximum desirable hardness of the generator feedwater;
   hardness control means for comparing said actual water hardness data signal and said maximum water hardness data signal and for producing a hardness control signal in response thereto; and
   hardness adjustments means for adding a chemical to the generator feedwater in response to said hardness control signal for the purpose of adjusting the hardness of the generator feedwater.

24. A control apparatus for controlling the generators of a multiple steam generator or a multiple hot water generator installation, said control apparatus comprising:
   load data means for providing predicted load data for each of a plurality of time intervals which fall within a sequence time period, with said predicted load data corresponding to the predicted loads of said installation over said sequence time period;
   burner command means responsive to said predicted load data for limiting the firing rate of each of said generators to one of at least two different maximum firing rate levels, with one of said maximum firing rate levels being a level wherein said generators are shut off; and
   modulating control means for controlling the actual firing rate of said generators within said maximum firing rate levels in response to the actual load of said facility,
   whereby said actual firing rate of each of said generators may be controlled so as to optimize efficiency of the installation.

* * * * *